United States Patent
Horii

(10) Patent No.: US 10,116,223 B2
(45) Date of Patent: Oct. 30, 2018

(54) SWITCHING POWER SUPPLY APPARATUS CAPABLE OF ACHIEVING SOFT SWITCHING OPERATION

(71) Applicant: COSEL CO., LTD., Toyama (JP)

(72) Inventor: Kazuhiro Horii, Toyama (JP)

(73) Assignee: COSEL CO., LTD., Toyama (JP)

( * ) Notice: Subject to any disclaimer, the term of this patent is extended or adjusted under 35 U.S.C. 154(b) by 0 days.

(21) Appl. No.: 15/429,642

(22) Filed: Feb. 10, 2017

(65) Prior Publication Data

US 2017/0179838 A1 Jun. 22, 2017

Related U.S. Application Data

(63) Continuation of application No. PCT/JP2015/061966, filed on Apr. 20, 2015.

(30) Foreign Application Priority Data

Oct. 3, 2014 (JP) ................. 2014-204549

(51) Int. Cl.
*H02M 3/335* (2006.01)
*H02M 1/08* (2006.01)
(Continued)

(52) U.S. Cl.
CPC ......... *H02M 3/33592* (2013.01); *H02M 1/08* (2013.01); *H02M 1/32* (2013.01);
(Continued)

(58) Field of Classification Search
CPC ...... H02M 3/33592; H02M 1/08; H02M 1/32; H02M 2001/0048
See application file for complete search history.

(56) References Cited

U.S. PATENT DOCUMENTS 9,166,498 B2 * 10/2015 Feno ............... H02M 7/219
2012/0014152 A1 1/2012 Nakamura et al.
(Continued)

FOREIGN PATENT DOCUMENTS

| JP | 8-66025 | 3/1996 |
|---|---|---|
| JP | 2012-23835 | 2/2012 |

(Continued)

OTHER PUBLICATIONS

International Search Report issued in International Application No. PCT/JP2015/061966 dated Jul. 21, 2015.
(Continued)

*Primary Examiner* — Emily P Pham
(74) *Attorney, Agent, or Firm* — Wenderoth, Lind & Ponack, L.L.P.

(57) ABSTRACT

A switching power supply apparatus is configured of, as a primary-side circuit, a synchronous rectification step-up/down chopper circuit including a main switching element (14), a commutation element (16), a choke coil (18), and a buffer capacitor (20). As a secondary-side circuit, to a secondary winding provided to the choke coil, a series circuit including a rectifying element and an output capacitor is connected. An inductance of the choke coil is set to have a predetermined value so that a choke coil current IL flowing through the choke coil flows in both of a positive direction and a negative direction across zero in one cycle of switching when an output current is equal to or smaller than a maximum output current. A switching control circuit performs control of complementarily turning the main switching element and the commutation element ON/OFF in a switching cycle by providing a deadtime, thereby performing soft switching.

4 Claims, 18 Drawing Sheets

(51) Int. Cl.
  *H02M 1/32*    (2007.01)
  *H02M 3/337*   (2006.01)
  *H02M 1/00*    (2006.01)
  *H02M 1/38*    (2007.01)
(52) U.S. Cl.
  CPC ............ *H02M 3/3376* (2013.01); *H02M 1/38* (2013.01); *H02M 2001/0003* (2013.01); *H02M 2001/0048* (2013.01)

(56) References Cited

U.S. PATENT DOCUMENTS

| | | |
|---|---|---|
| 2012/0033455 A1 | 2/2012 | Hosotani et al. |
| 2013/0308347 A1 | 11/2013 | Sato et al. |

FOREIGN PATENT DOCUMENTS

| | | |
|---|---|---|
| JP | 2012-100490 | 5/2012 |
| JP | 5447507 | 3/2014 |
| JP | 2014-60850 | 4/2014 |
| WO | 2010/119761 | 10/2010 |
| WO | 2012/105077 | 8/2012 |

OTHER PUBLICATIONS

International Preliminary Report on Patentability dated Apr. 4, 2017 in International Application No. PCT/JP2015/061966 (with English translation).
Notification of Reasons for Refusal dated Oct. 4, 2017 in Japanese Application No. 2014-204549, with English translation.

\* cited by examiner

[FIG. 1]
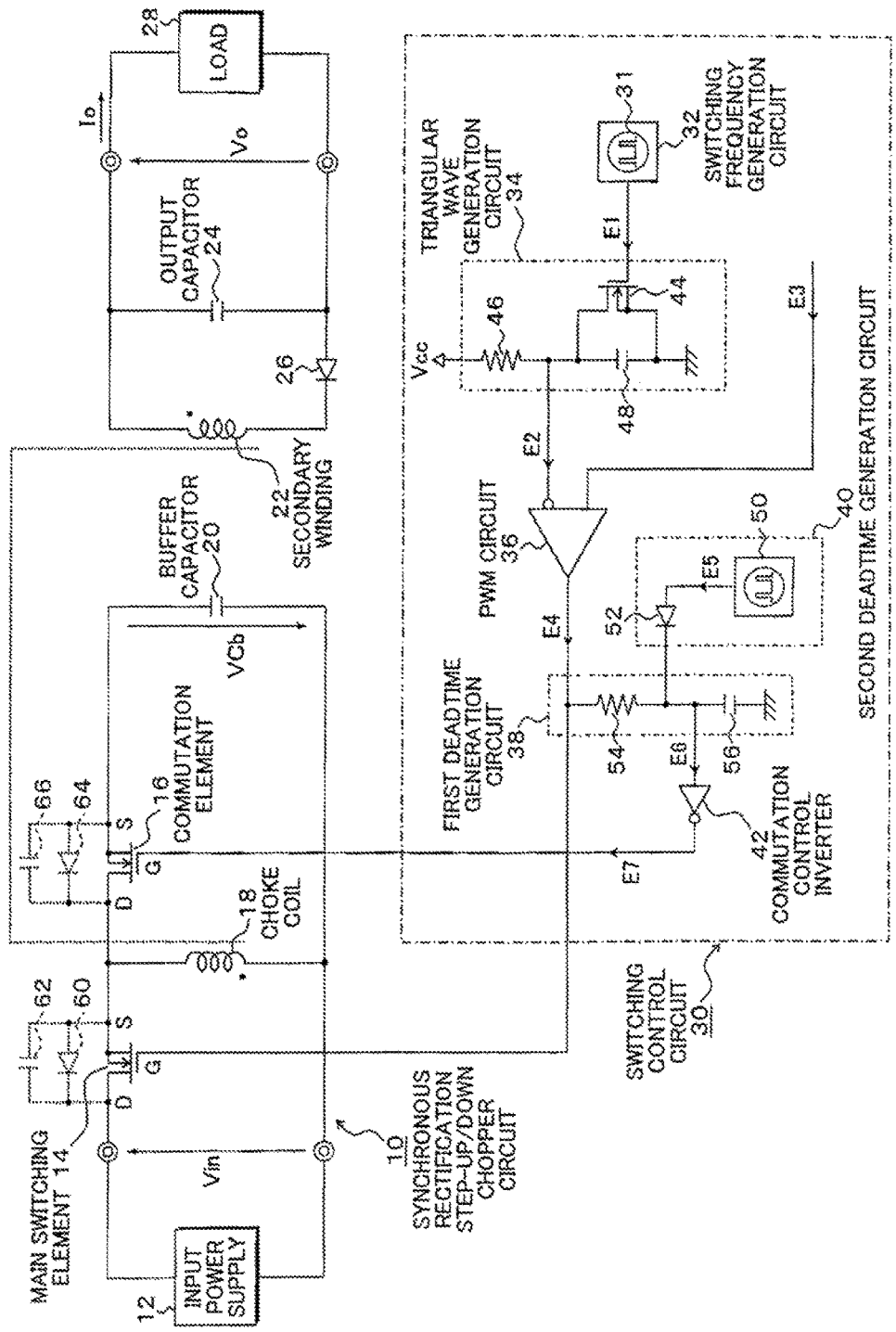

[FIG.2]
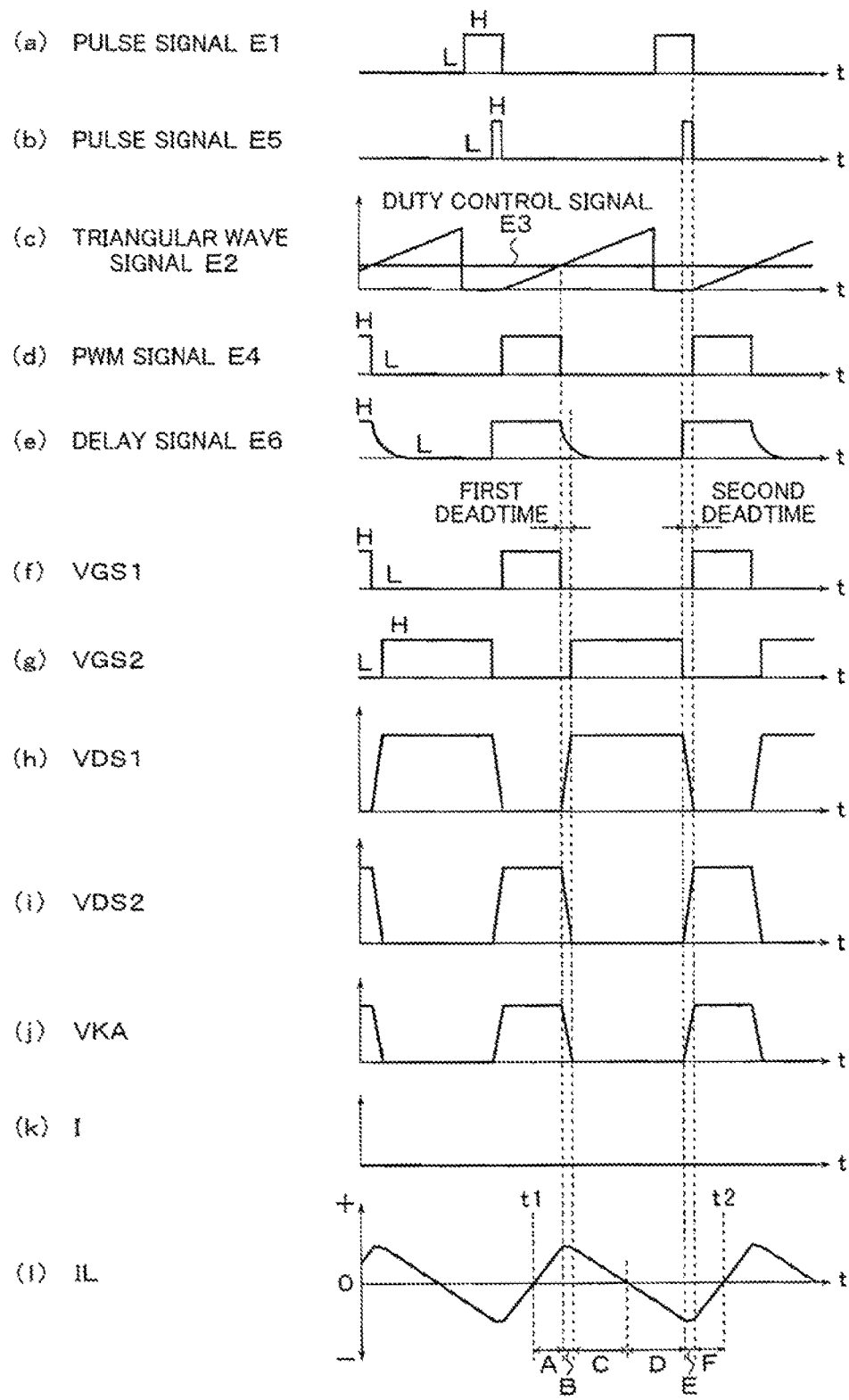

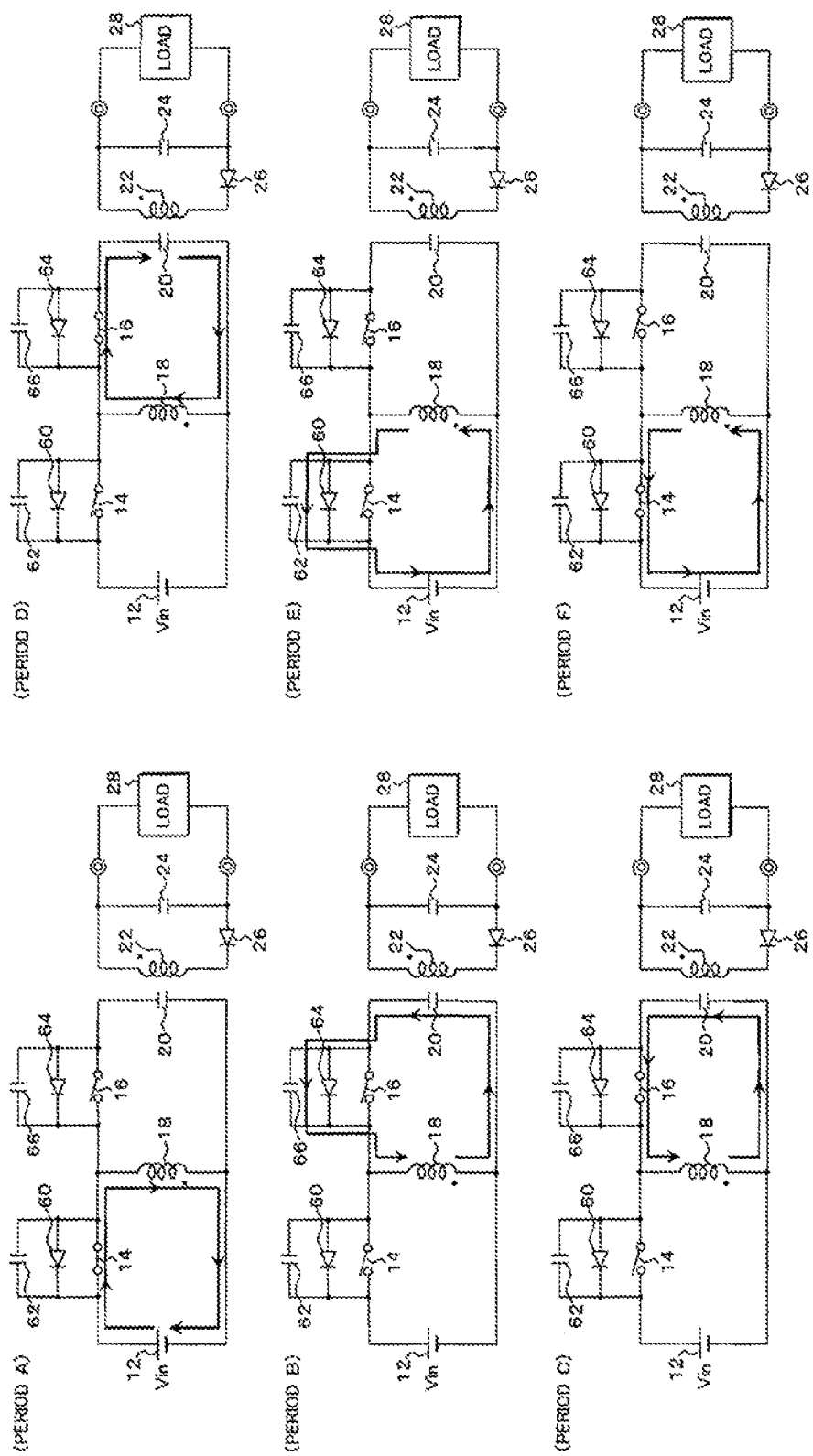

[FIG.4]
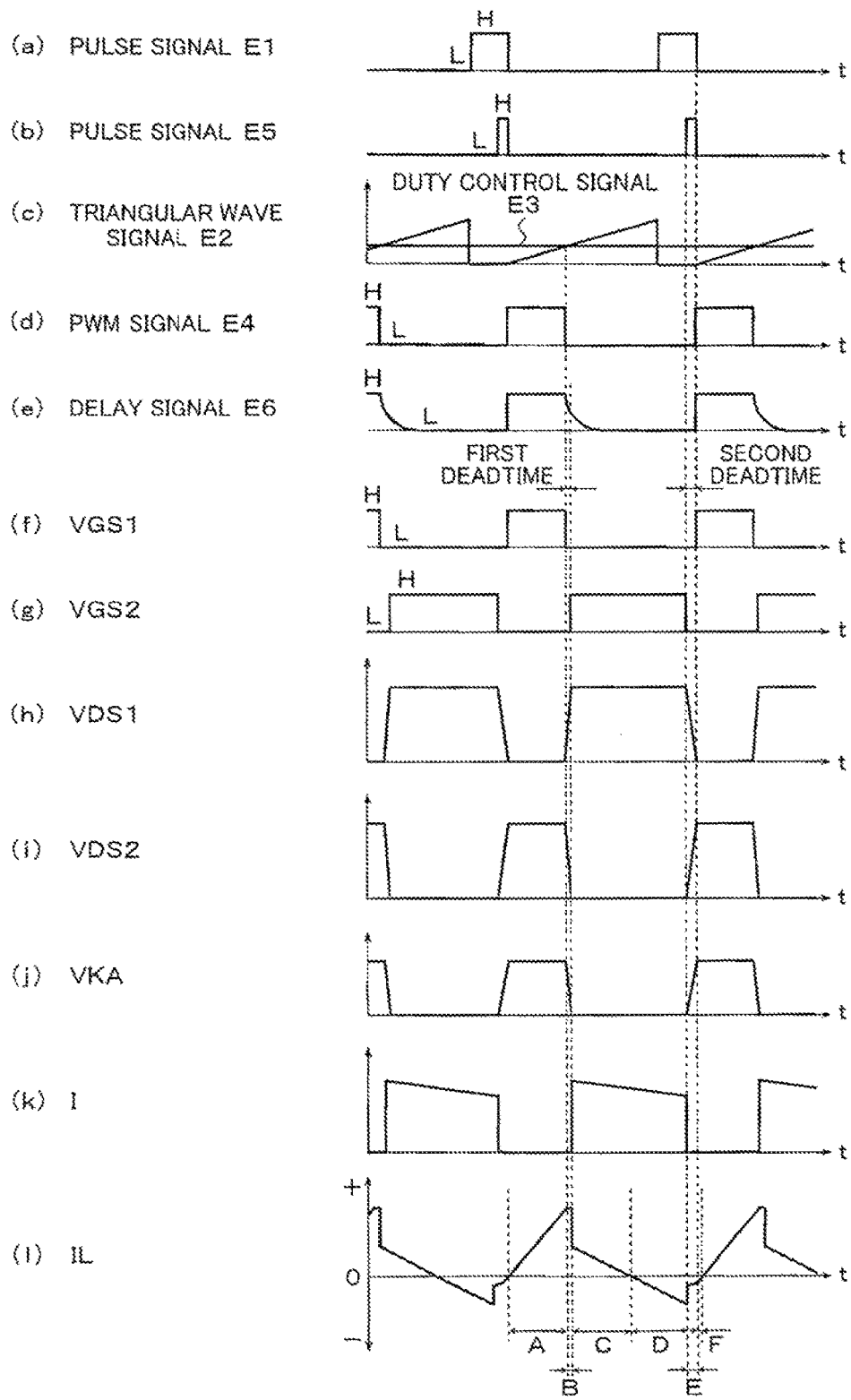

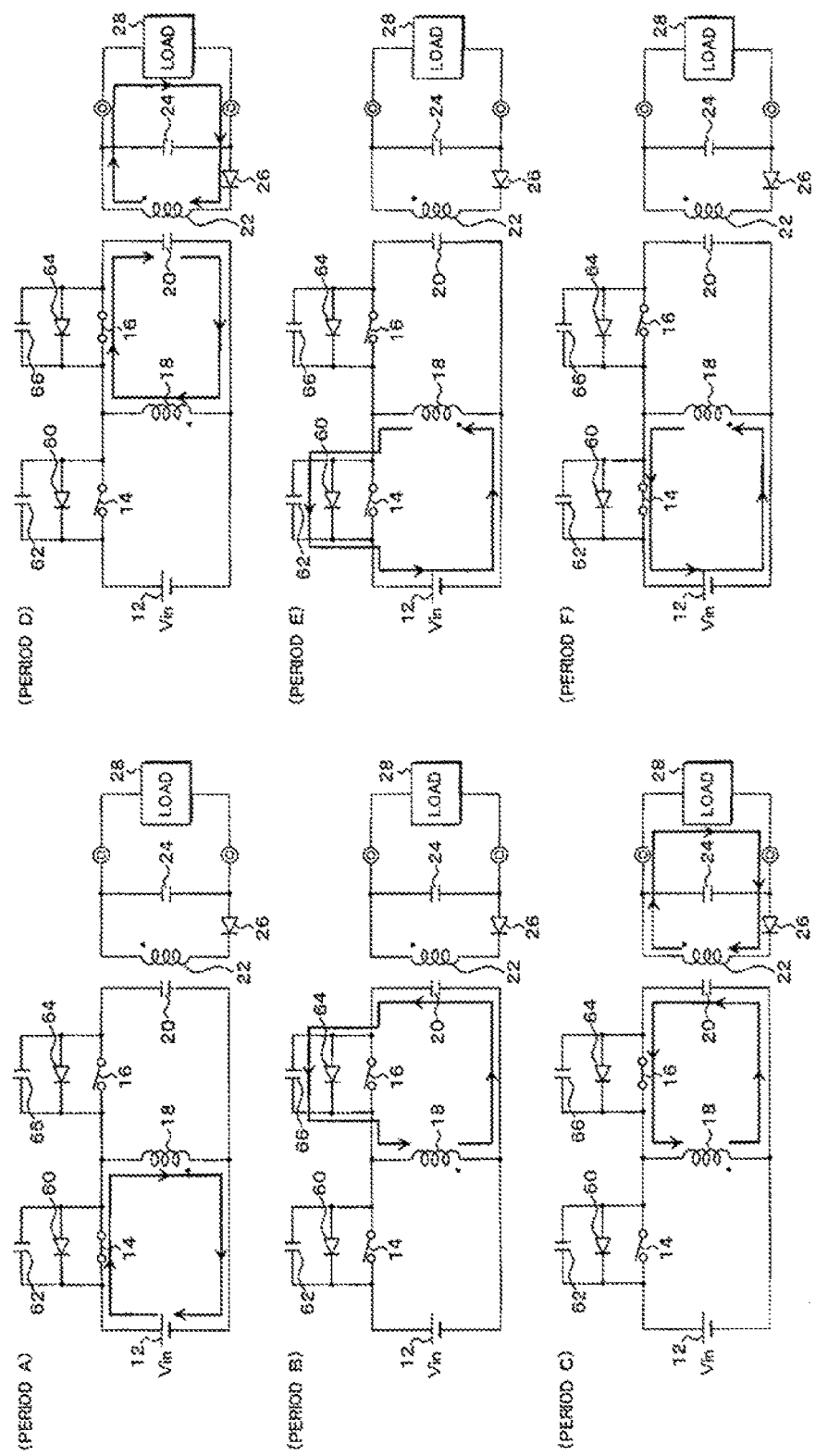
[FIG. 5]

[FIG. 6]
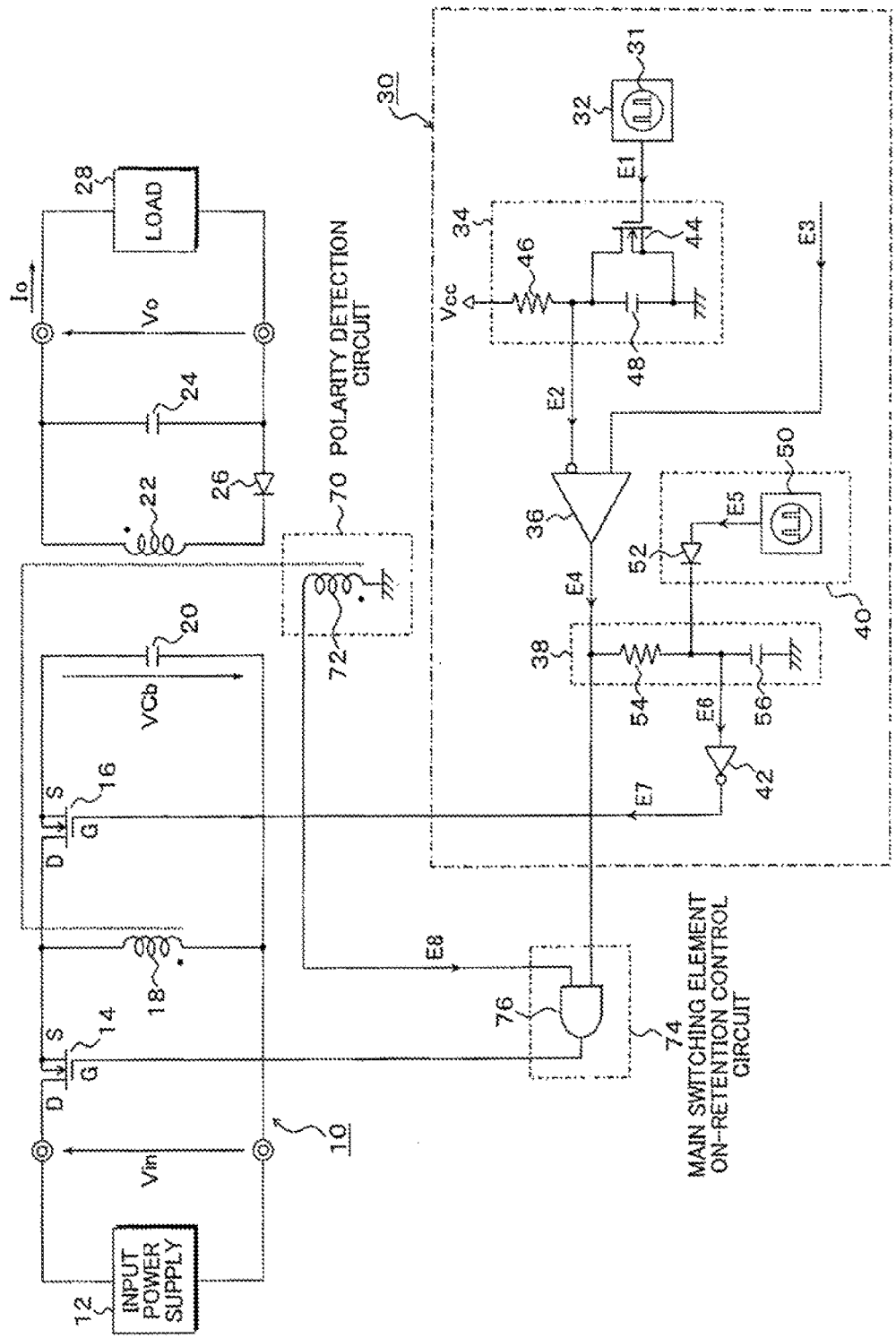

[FIG.7]
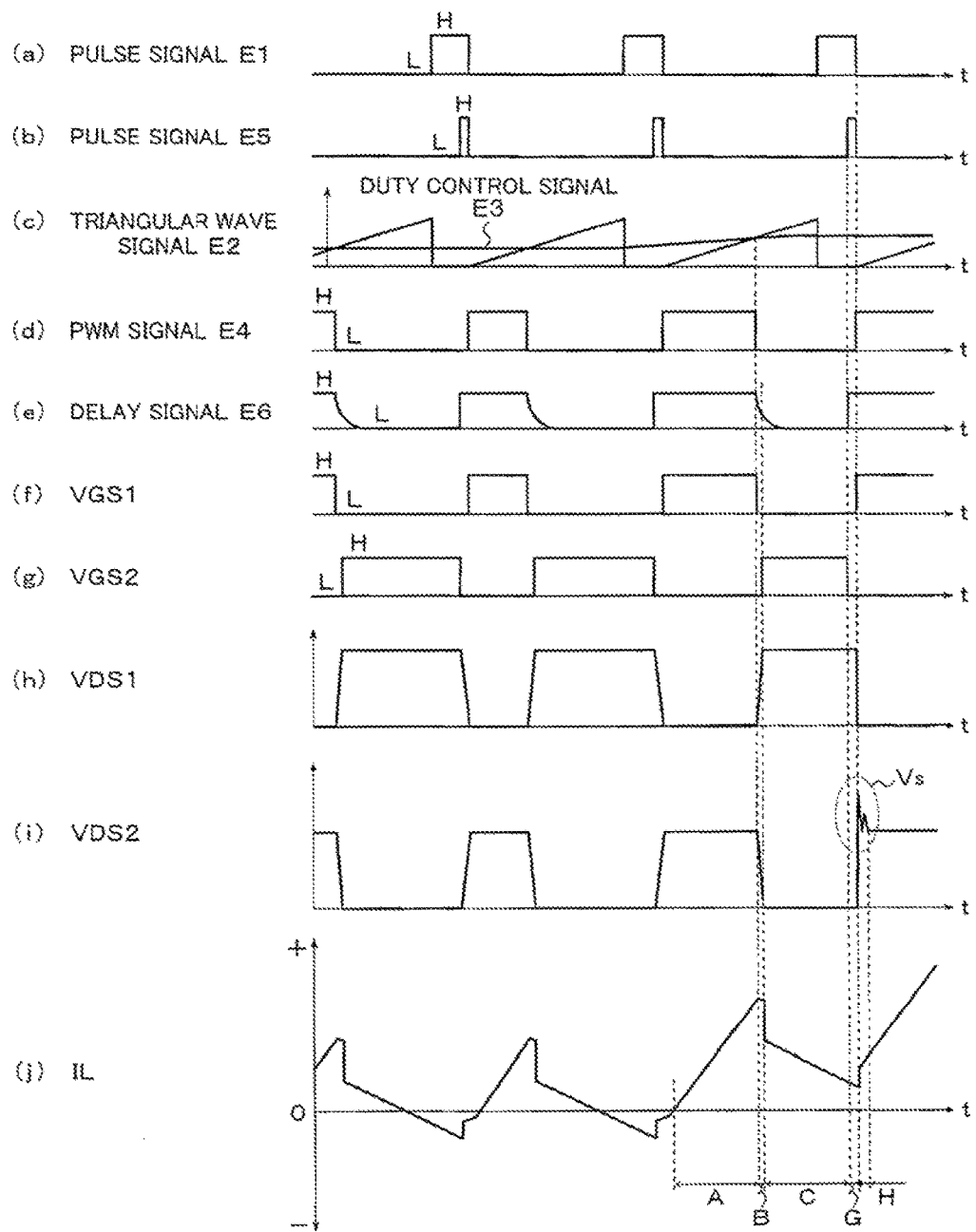

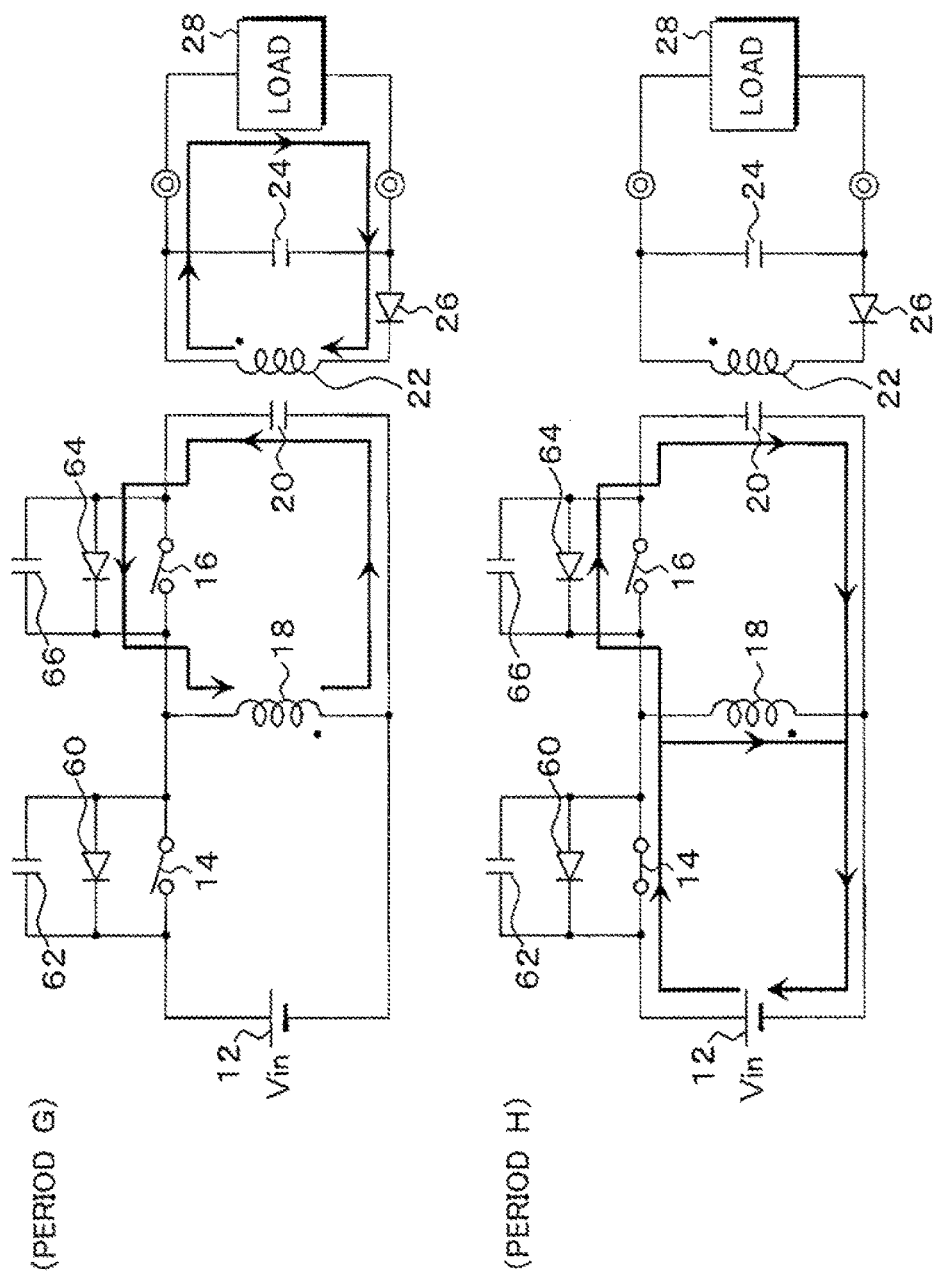

[FIG.9]
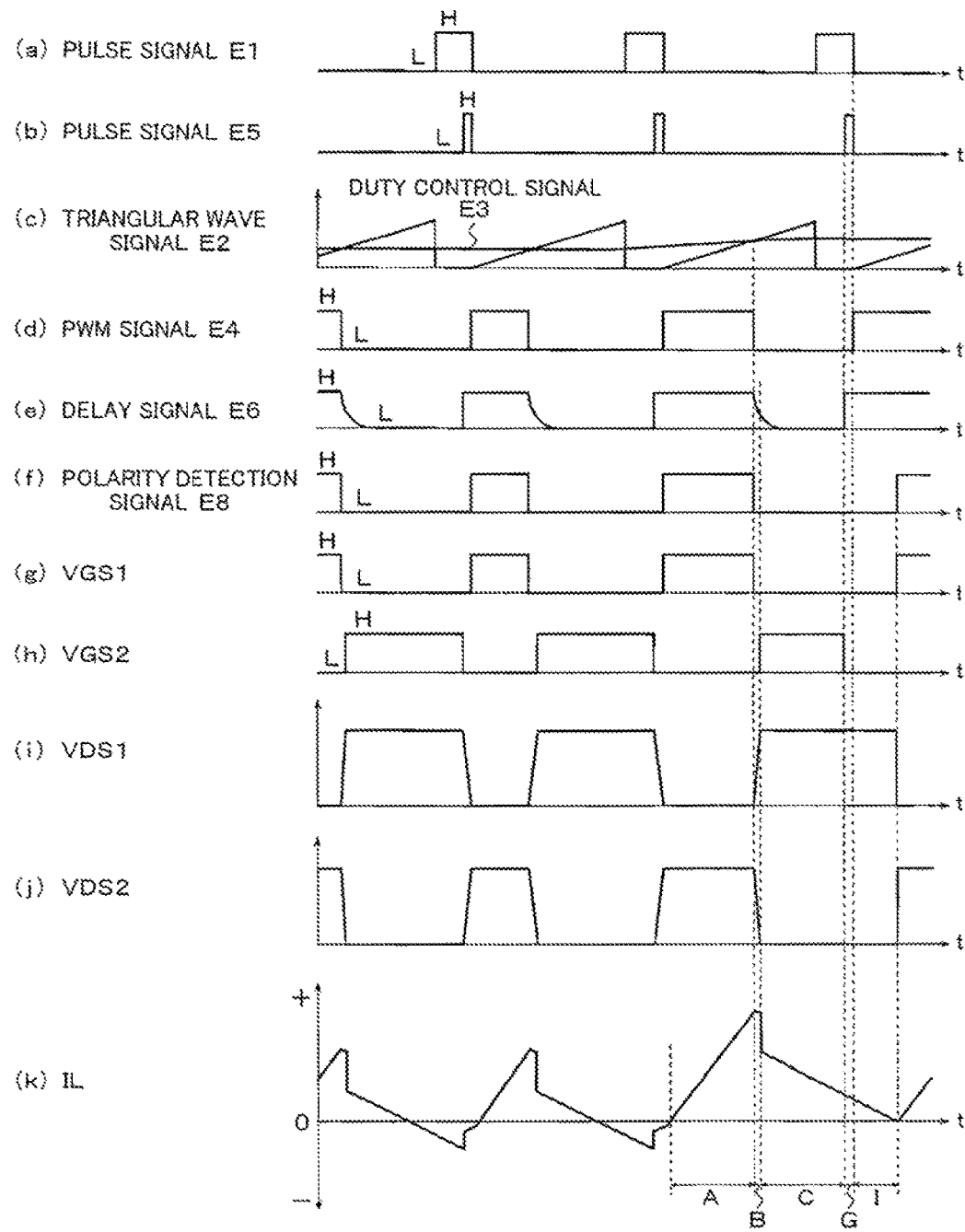

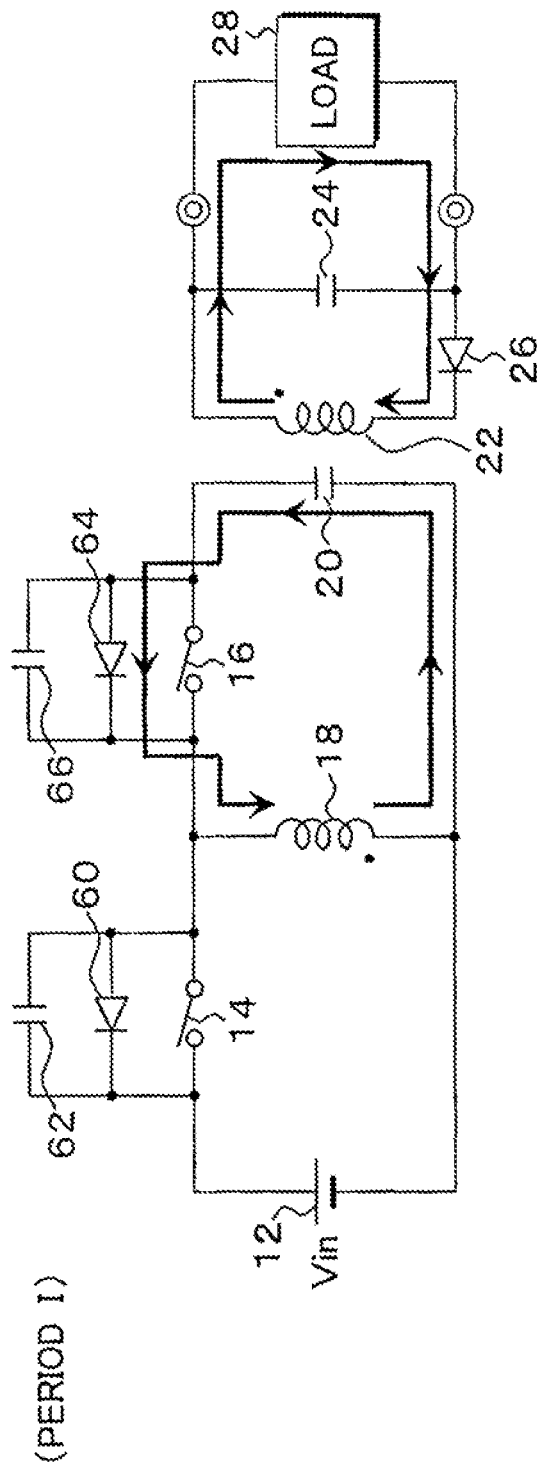
[FIG. 10]
(PERIOD I)

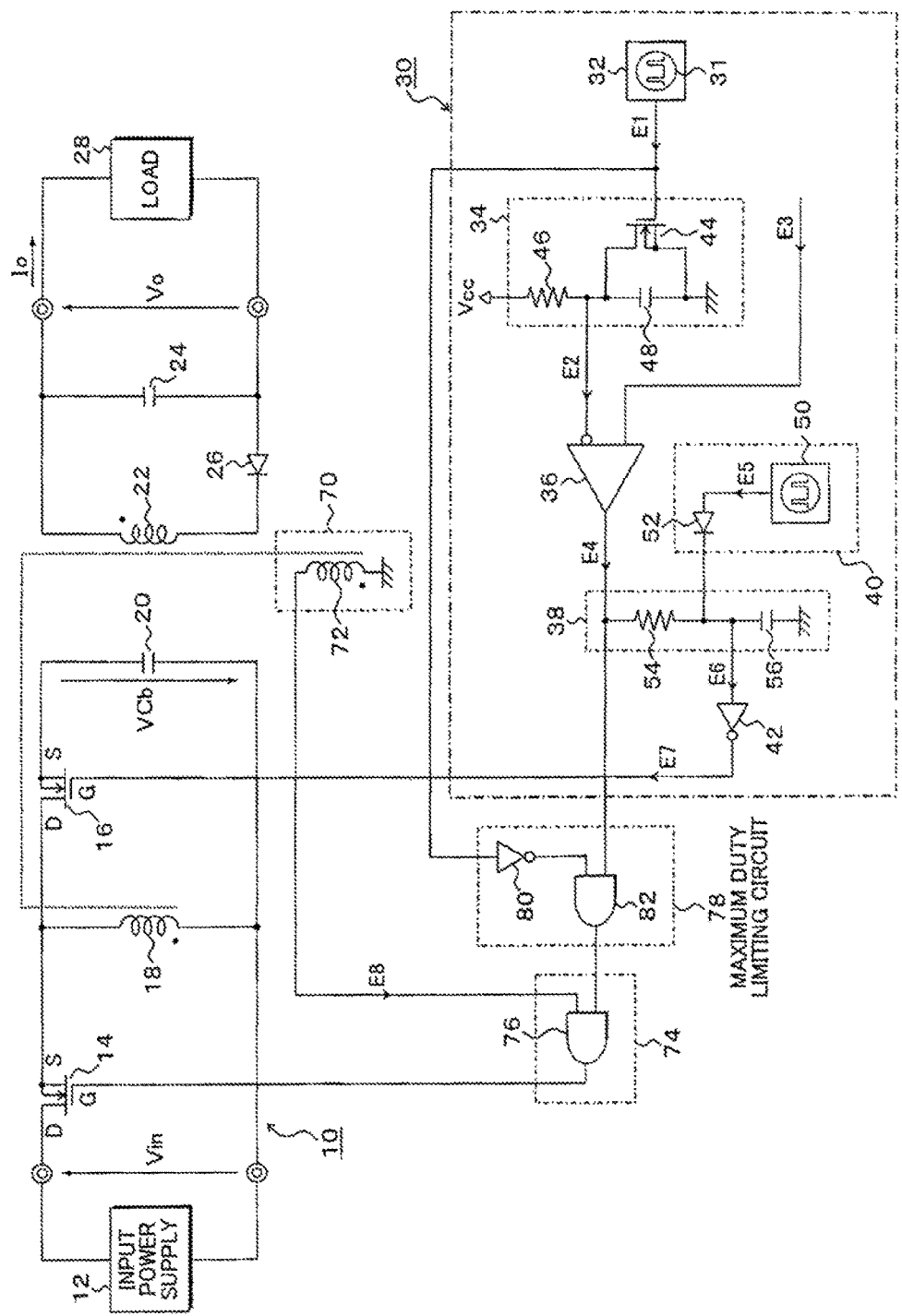
[FIG. 11]

[FIG.12]
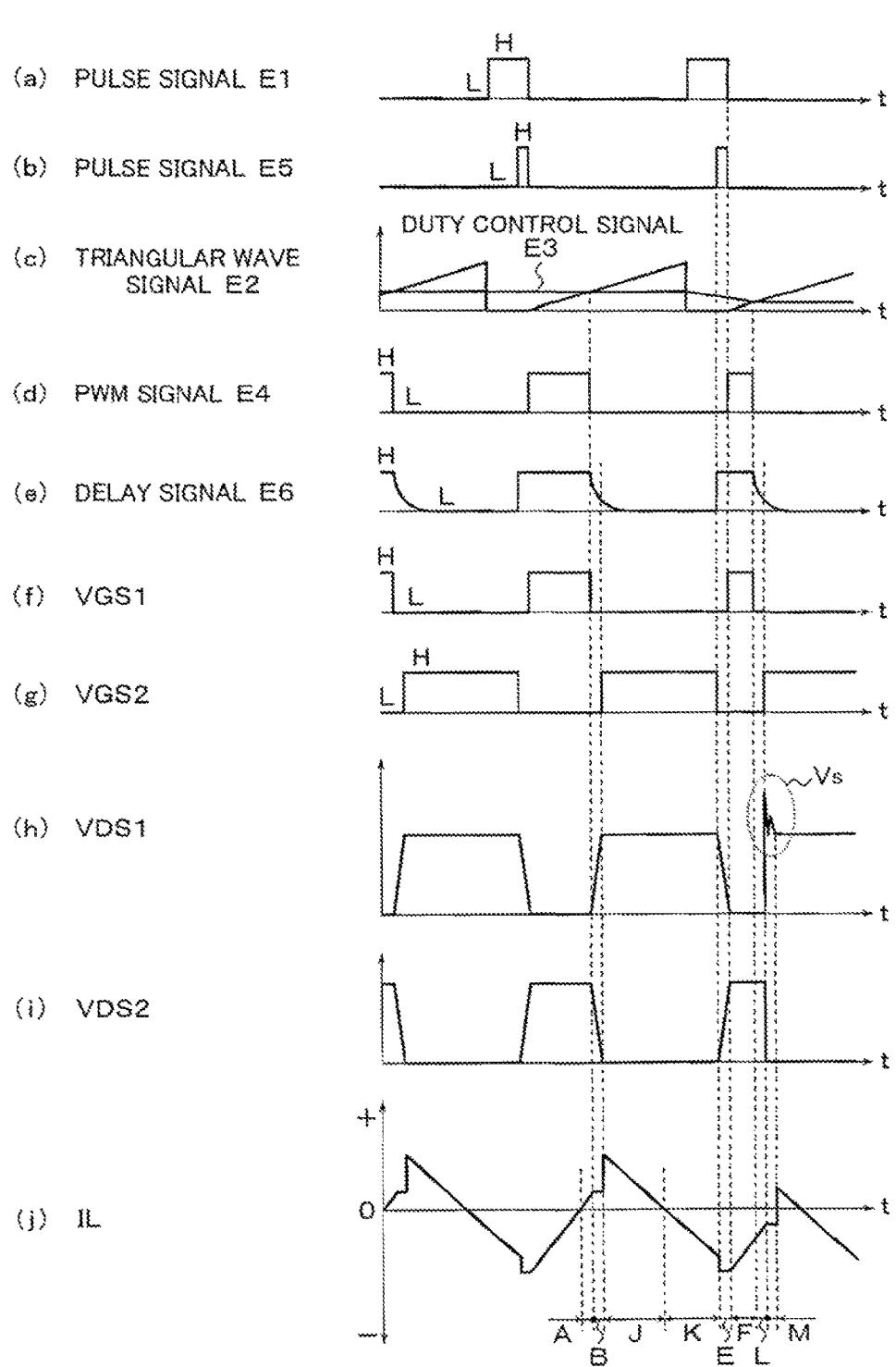

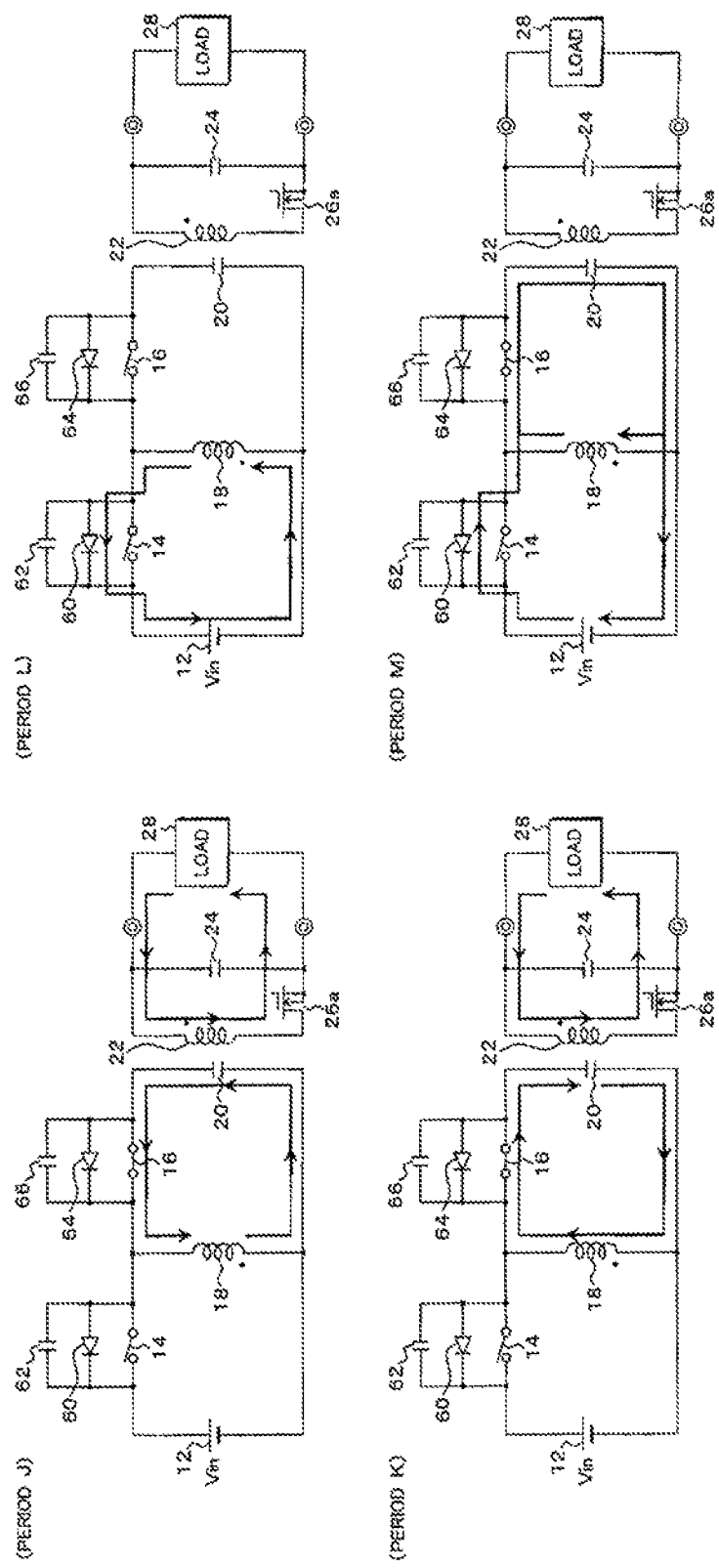
[FIG. 13]

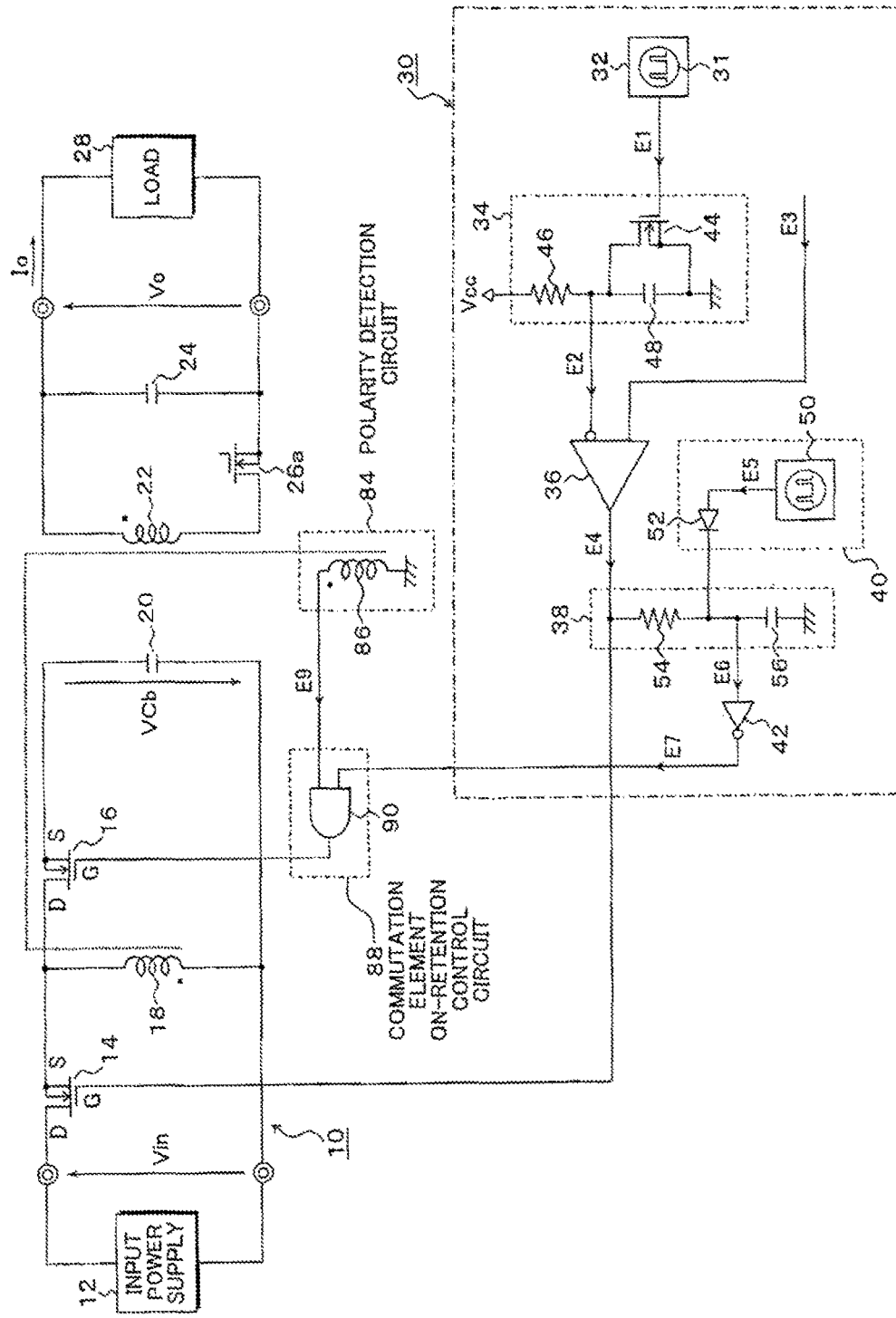
[FIG. 14]

[FIG.15]
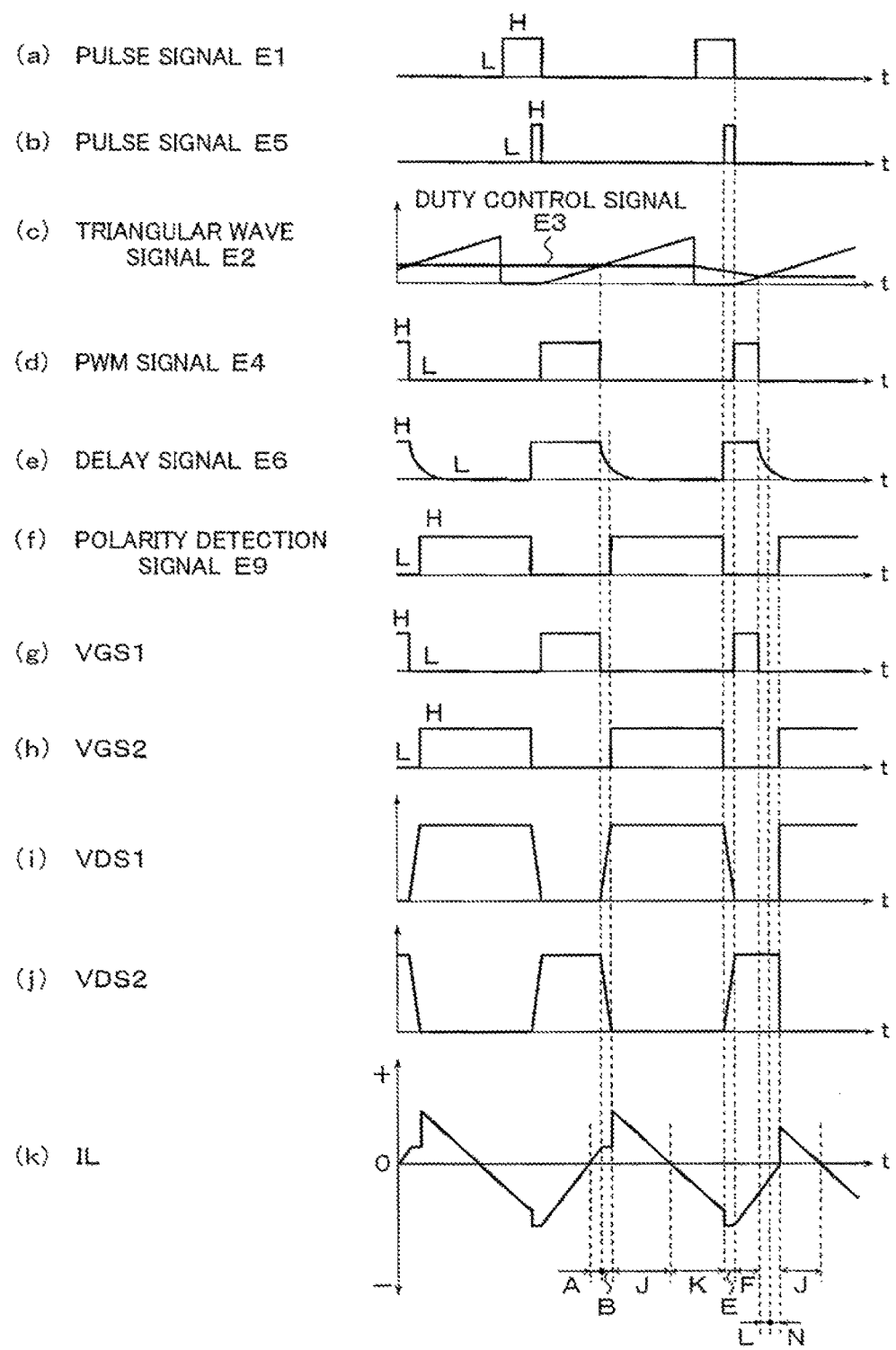

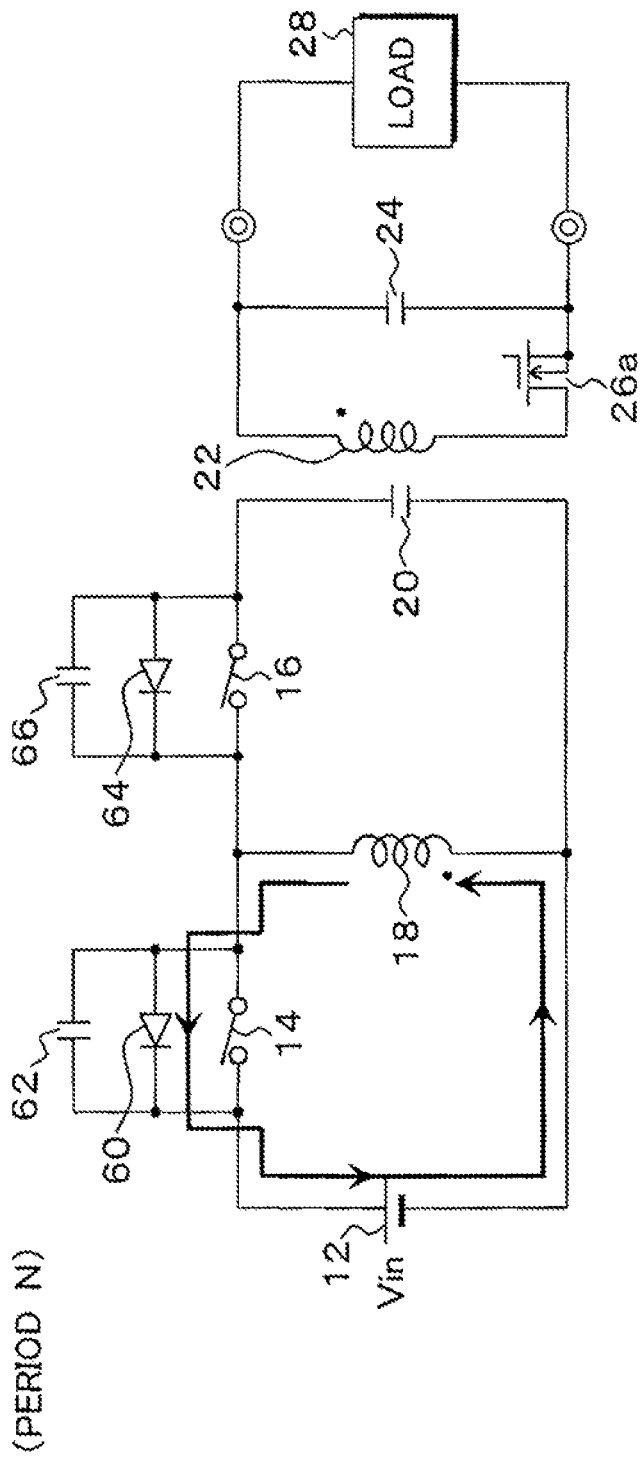
[FIG. 16]
(PERIOD N)

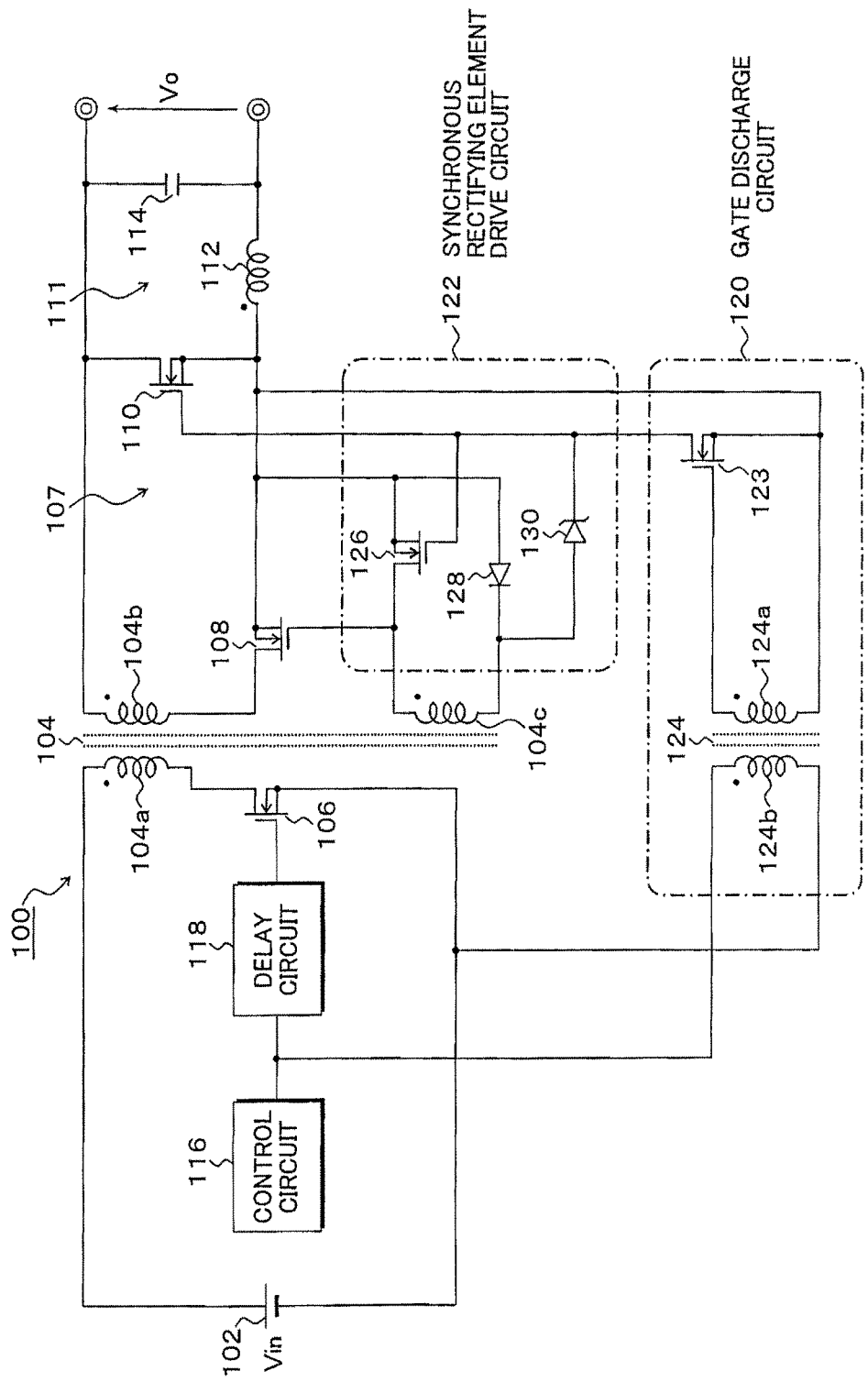
[FIG. 17] PRIOR ART

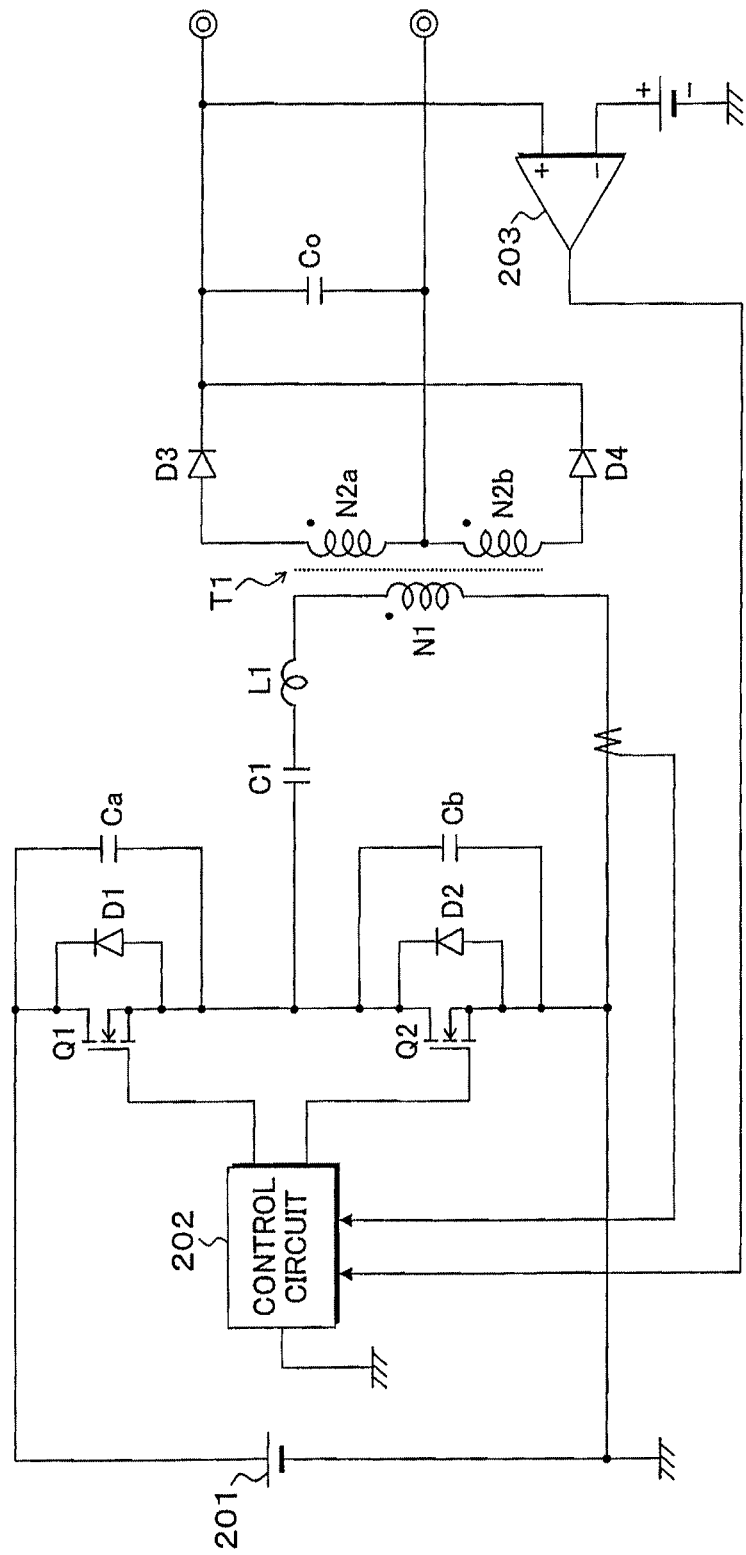
[FIG. 18] PRIOR ART

US 10,116,223 B2

SWITCHING POWER SUPPLY APPARATUS CAPABLE OF ACHIEVING SOFT SWITCHING OPERATION

BACKGROUND OF THE INVENTION

1. Technical Field

The present invention relates to a switching power supply apparatus which functions as an insulation-type converter which converts an input voltage into a desired voltage for supply to electronic equipment.

2. Description of the Related Art (Single-Ended Forward Converter)

Conventionally, as an insulation-type converter capable of converting an input voltage into a predetermined voltage to obtain an output voltage, a single-ended forward converter has been known (Patent Document 1).

As depicted in FIG. 17, a single-ended forward converter 100 is configured so as to have an input power supply 102 to which a primary winding 104a of a main transformer 104 and a switching element 106 are connected. To a secondary winding 104b of the main transformer 104, a rectifying circuit 107 including a forward-side synchronous rectifying element 108 and a flywheel-side synchronous rectifying element 110 and a smoothing circuit 111 including an output choke coil 112 and an output capacitor 114 are connected. To the output capacitor 114, a load is connected. Thus, output electric power can be obtained.

A control circuit 116 is a PWM control circuit which generates a fixed switching frequency, and ON/OFF of the main switching element 106 is controlled.

ON/OFF of the forward-side synchronous rectifying element 108 and the flywheel-side synchronous rectifying element 110 is controlled by a synchronous rectifying element drive circuit 122 including a switching element 126 which operates upon receiving a voltage generated at a tertiary winding 104c of the main transformer 104, a diode 128, and a Zener diode 130 and a gate discharge circuit 120 including a switching element 126 and a signal transmission transformer 124.

The forward-side synchronous rectifying element 108 is turned ON/OFF in synchronization with ON/OFF of the main switching element 106. The flywheel-side synchronous rectifying element 110 is turned ON when the main switching element 106 is in an OFF state, and is turned OFF when the main switching element 106 is in an ON state. OFF of the flywheel-side synchronous rectifying element 110 and ON of the main switching element 106 (corresponding to ON of the forward-side synchronous rectifying element 108) are driven, with deadtimes provided by a delay circuit 118.

Electric power supplied from the input power supply 102 is supplied to the main transformer 104 as interrupted electric power by ON/OFF of the main switching element 106. The primary winding 104a and the secondary winding 104b of the main transformer 104 are used in forward coupling, and electric power when the main switching element 106 is in an ON state is transmitted from the primary winding 104a to the secondary winding 104b.

By the rectifying circuit 107 and the smoothing circuit 111 rectifying and smoothing electric power transmitted through forward coupling in the main transformer 104, an output electric power Vo is generated. The output voltage Vo is determined by an input voltage Vin, a turns ratio between wire turns N1 of the primary winding 104a and wire turns N2 of the secondary winding 104b in the main transformer 104 (N2/N1), and on-duty duty of the main switching element 106.

$Vo = (N2/N1) \cdot Vin \cdot duty$

The single-ended forward converter 100 operates with a fixed switching frequency and, since the output voltage can be controlled by on-duty of the main switching element 106, can be operated with a simple control circuit (PWM control circuit). Also, since the main transformer 104 is used as a forward transformer, conversion efficiency of the transformer is high.

(LLC Resonant Converter)

Conventionally, as another type of the insulation-type converter capable of converting an input voltage into a predetermined voltage to obtain an output voltage, an LLC resonant converter is present (Patent Documents 2 and 3).

FIG. 18 depicts a conventional LLC resonant converter (Patent Document 2). To a primary winding N1 of a main transformer T1 provided to the LLC resonant converter, a serial resonant circuit including a resonant capacitor C1 and a resonant inductor L1 is connected. Switching elements Q1 and Q2 form a half-bridge circuit in which the elements are symmetrical with a duty of approximately 50% and are alternately turned ON/OFF, and switching frequencies of the switching elements Q1 and Q2 are controlled so that the resonant capacitor C1, the resonant inductor L1, and the main transformer T1 are in a resonant state.

The structure is such that a full-wave rectifying circuit of a center tap type including rectifying elements D3 and D4 and a smoothing circuit including an output capacitor Co are connected to a secondary winding N2 of the main transformer T1 and a load is connected to the output capacitor Co.

A control circuit 202 which drives the switching elements Q1 and Q2 is a frequency modulation control circuit (PFM control circuit), and the switching frequency is controlled so that the output voltage has a predetermined value by control of a VCO (voltage controlled oscillator) in accordance with an error voltage between an output voltage by a differential amplifier 203 and a reference voltage. Here, the switching frequency is controlled so that the resonant capacitor C1, the resonant inductor L1, and the main transformer T1 are always in a resonant state.

Unlike the single-ended forward converter depicted in FIG. 17, the LLC resonant converter is free from an increase in switching loss, generation of surge voltage, and so forth because the switching elements Q1 and Q2 are driven by soft switching operation. Therefore, a switching power supply with high efficiency and low noise can be obtained.

RELATED ART DOCUMENTS

Patent Documents

Patent Document 1: Japanese Patent Application Laid-Open (kokai) No. 2012-100490
Patent Document 2: Japanese Patent Application Laid-Open (kokai) No. 08-066025
Patent Document 3: Japanese Patent Application Laid-Open (kokai) No. 2014-060850

SUMMARY OF THE INVENTION

1. Problems to be Solved by the Invention

However, since the main switching element is used by hard switching and an increase in switching loss, generation of surge voltage, and so forth are observed, the conventional single-ended forward converter depicted in FIG. 17 has problems of a decrease in efficiency, generation of large noise, and so forth.

By contrast, since the switching elements are driven by soft switching operation, the conventional LLC resonant converter depicted in FIG. 18 is free from an increase in switching loss, generation of surge voltage, and so forth, and a switching power supply with high efficiency and low noise can be obtained.

However, the conventional LLC resonant converter is required to control the switching frequency so as to keep a resonant state even if conditions such as the input voltage and the load current are changed, a complex and expensive control circuit is required.

Also, when the input voltage, output voltage, load current, and so forth are changed, if control of changing the switching frequency does not keep up with that change, so-called "off-resonance" occurs. When "off-resonance" occurs, the switching element cannot perform soft switching operation to cause a phenomenon such as causing a hard switching state or letting a through current flow to give the switching element stress by enormous surge voltage and, at the worst, causing an inconvenience such as causing a malfunction in the switching power supply apparatus.

Moreover, the frequency modulation technique of the LLC resonant converter has an inconvenience of having a measurement-type influence on equipment handling a weak signal such as measurement equipment. For example, there is a problem of increasing an error in conversion of an AD converter if the sampling rate of the AD converter and the switching frequency are close to each other.

An object of the present invention is to provide, as for an insulation-type converter circuit, a switching power supply apparatus capable of achieving soft switching operation to allow high efficiency, low noise, and low cost.

2. Means for Solving the Problems (Switching Power Supply Apparatus)
The present invention is characterized in that,
in a switching power supply apparatus in which,
as a primary-side circuit, a synchronous rectification step-up/down chopper circuit is configured in which a series circuit including a main switching element and a choke coil is connected in parallel with an input power supply and a series circuit including a buffer capacitor and a commutation element is connected in parallel with the choke coil, and as a secondary-side circuit, a circuit is configured in which a secondary winding is provided to the choke coil, a series circuit including a rectifying element and an output capacitor is connected to the secondary winding, and output electric power is obtained from both ends of the output capacitor, an inductance of the choke coil is set to have a value so that a current flowing through the choke coil flows in both of a positive direction and a negative direction in one cycle of switching when an output current is equal to or smaller than a predetermined rated value (maximum output current), and the apparatus includes a switching control circuit having a function of complementarily turning the main switching element and the commutation element ON/OFF with a predetermined switching frequency by providing a deadtime.

(Prevention of Occurrence of Surge with Respect to Load Excessive Current)
The present invention is characterized in that,
in a switching power supply apparatus in which,
as a primary-side circuit, a synchronous rectification step-up/down chopper circuit is configured in which a series circuit including a main switching element and a choke coil is connected in parallel with an input power supply and a series circuit including a buffer capacitor and a commutation element is connected in parallel with the choke coil, and as a secondary-side circuit, a circuit is configured in which a secondary winding is provided to the choke coil, a series circuit including a rectifying element and an output capacitor is connected to the secondary winding, and output electric power is obtained from both ends of the output capacitor, an inductance of the choke coil is set to have a value so that a current flowing through the choke coil flows in both of a positive direction and a negative direction in one cycle of switching when an output current is equal to or smaller than a predetermined rated value (maximum output current), and the apparatus includes:
a switching control circuit which performs control so as to complementarily turn the main switching element and the commutation element ON/OFF with a predetermined switching frequency by providing a deadtime;
a polarity detection circuit which detects a polarity of the choke coil and outputs a polarity detection signal; and
a main switching element ON-retention control circuit which performs control so that an ON signal of the main switching element outputted by the switching control circuit is retained and OFF continues when the polarity detection circuit outputs the polarity detection signal.

Here, the switching power supply apparatus further includes a current limiting circuit which limits a maximum output current by providing an OFF period of the main switching element in one cycle of a switching cycle.

(Regenerative Operation)
The present invention is characterized in that,
in a switching power supply apparatus in which,
as a primary-side circuit, a synchronous rectification step-up/down chopper circuit is configured in which a series circuit including a main switching element and a choke coil is connected in parallel with an input power supply and a series circuit including a buffer capacitor and a commutation element is connected in parallel with the choke coil, and as a secondary-side circuit, a circuit is configured in which a secondary winding is provided to the choke coil, a series circuit including a rectifying element and an output capacitor is connected to the secondary winding, and output electric power is obtained from both ends of the output capacitor, an inductance of the choke coil is set to have a value so that a current flowing through the choke coil flows in both of a positive direction and a negative direction in one cycle of switching when an output current is equal to or smaller than a predetermined rated value (maximum output current), and the apparatus includes:
a switching control circuit which performs control so as to complementarily turn the main switching element and the commutation element ON/OFF with a predetermined switching frequency by providing a deadtime and also provide an OFF period of the commutation element within one cycle of the switching;
a polarity detection circuit which detects a polarity of the choke coil and outputs a polarity detection signal; and
a commutation element ON-retention control circuit which performs control so that an ON signal of the commutation element outputted by the switching control circuit is retained and OFF continues when the polarity detection circuit outputs the polarity detection signal.

3. Effects of the Invention (Basic Effects)

In the present invention, in a switching power supply apparatus in which, as a primary-side circuit, a synchronous rectification step-up/down chopper circuit is configured in which a series circuit including a main switching element and a choke coil is connected in parallel with an input power supply and a series circuit including a buffer capacitor and a commutation element is connected in parallel with the choke coil, and as a secondary-side circuit, a circuit is configured in which a secondary winding is provided to the choke coil, a series circuit including a rectifying element and an output capacitor is connected to the secondary winding, and output electric power is obtained from both ends of the output capacitor, an inductance of the choke coil is set to have a value so that a current flowing through the choke coil flows in both of a positive direction and a negative direction across zero in one cycle of switching when an output current is equal to or smaller than a predetermined rated value (maximum output current), and the apparatus includes a switching control circuit having a function of complementarily turning the main switching element and the commutation element ON/OFF with a predetermined switching frequency by providing a deadtime. Thus, in the synchronous rectification step-up/down chopper circuit on the primary side, the capacitor connected to the choke coil (primary winding) is used as a buffer capacitor, excitation energy is accumulated in the choke coil when the main switching element is in an ON state, and the excitation energy of the choke coil and electric charge energy of the buffer capacitor are transmitted from the secondary winding of the output choke coil to a load side when the commutation element is in an ON state. Here, the choke coil operates as a flyback transformer as well as a forward transformer, and the primary winding and the secondary winding are in a state of being coupled. Therefore, the voltages of the buffer capacitor and the output capacitor have a relation proportional with a turns ratio between wire turns of the primary winding and the secondary winding of the choke coil (transformer), allowing operation as an insulation-type converter.

Also, when the output current is in a range from zero to the rated value (rated current), the inductance of the output choke coil is set so that the commutation element can be turned OFF in a state in which the current of the choke coil is oriented to a minus direction. Thus, by providing a deadtime to the main switching element and the commutation element for driving, the parasitic capacitance of the main switching element can be drawn. Thus, soft switching operation can be made, and a switching power supply apparatus with high efficiency and low noise can be created.

Also, even if the input voltage, output voltage, output current, and so forth are changed, operation is made with a fixed frequency, and the output voltage can be controlled by on-duty of the main switching element, and therefore the control circuit can also be inexpensively and easily achieved.

Also, since a surge voltage, which is a problem of the single-ended forward converter, does not occur, a semiconductor element (semiconductor element with small on-resistance) such as a MOS-FET with low withstand voltage can be used, contributing high efficiency and also allowing switching noise to be reduced.

Also, since frequency modulation control, which is required in the conventional LLC resonant converter, is not required, the control circuit can be configured at low cost.

Because of operating at the fixed frequency, the apparatus does not have an adverse effect such as a measurement error if used as measurement equipment.

Also, by setting the inductance of the output choke coil, a deadtime is provided to the main switching element and the commutation element for soft switching operation. With this, even if the input voltage, output voltage, load current, and so forth are changed, unlike the LLC resonant converter, an excessive stress is not applied to the switching element.

(Effect of Surge Occurrence Prevention with Respect to Load Excessive Current)

In the present invention, in a switching power supply apparatus in which, as a primary-side circuit, a synchronous rectification step-up/down chopper circuit is configured in which a series circuit including a main switching element and a choke coil is connected in parallel with an input power supply and a series circuit including a buffer capacitor and a commutation element is connected in parallel with the choke coil, and as a secondary-side circuit, a circuit is configured in which a secondary winding is provided to the choke coil, a series circuit including a rectifying element and an output capacitor is connected to the secondary winding, and output electric power is obtained from both ends of the output capacitor, an inductance of the choke coil is set to have a value so that a current flowing through the choke coil flows in both of a positive direction and a negative direction across zero in one cycle of switching when an output current is equal to or smaller than a predetermined rated value (maximum output current), and the apparatus includes: a switching control circuit which performs control so as to complementarily turn the main switching element and the commutation element ON/OFF with a predetermined switching frequency by providing a deadtime; a polarity detection circuit which detects a polarity of the choke coil and outputs a polarity detection signal; and a main switching element ON-retention control circuit which performs control so that an ON signal of the main switching element outputted by the switching control circuit is retained and OFF continues when the polarity detection circuit outputs the polarity detection signal. Thus, even if a current equal to or larger than the maximum output current value is tried to let flow, in a state in which no current flows through the parasitic diode of the commutation element, the main switching element is turned ON, and thus no surge voltage is generated.

Also, without occurrence of a surge voltage, a semiconductor element with low withstand voltage and low conduction resistance can be used as a semiconductor element such as a MOS-FET for use as the main switching element and the commutation element, and a switching power supply apparatus with low noise and high efficiency can be achieved.

Also, in the switching power supply apparatus, since a current limiting circuit which limits a maximum output current by providing an OFF period of the main switching element in one cycle of a switching cycle, the current peak value of the choke coil is not equal to or larger than one cycle of switching because of being limited by ON time of the main switching element, and an overcurrent protecting function, which is a function of inhibiting an excessive current from flowing, is also provided.

(Effects by Regenerative Operation)

In the present invention, in a switching power supply apparatus in which, as a primary-side circuit, a synchronous rectification step-up/down chopper circuit is configured in which a series circuit including a main switching element and a choke coil is connected in parallel with an input power supply and a series circuit including a buffer capacitor and a commutation element is connected in parallel with the choke coil, and as a secondary-side circuit, a circuit is configured in which a secondary winding is provided to the choke coil, a series circuit including a rectifying element and an output capacitor is connected to the secondary winding, and output electric power is obtained from both ends of the output capacitor, an inductance of the choke coil is set to have a value so that a current flowing through the choke coil flows in both of a positive direction and a negative direction across zero in one cycle of switching when an output current is equal to or smaller than a predetermined rated value (maximum output current), and the apparatus includes: a switching control circuit which performs control so as to complementarily turn the main switching element and the commutation element ON/OFF with a predetermined switching frequency by providing a deadtime and also provide an OFF period of the commutation element in one cycle of the switching; a polarity detection circuit which detects a polarity of the choke coil and outputs a polarity detection signal; and a commutation element ON-retention control circuit which performs control so that an ON signal of the commutation element outputted by the switching control circuit is retained and OFF continues when the polarity detection circuit outputs the polarity detection signal. Thus, a switching power supply apparatus with low noise and high efficiency and including a function of regenerating electric power from an output side to an input side can be achieved.

This regenerative operation occurs, for example, when a voltage higher than an output voltage setting value outputted by the switching power supply apparatus is applied to the output side of the switching power supply apparatus or when the output voltage setting value is abruptly decreased in a state in which a large-capacity capacitor is attached to the output side.

Also, the switching power supply apparatus of the present invention can create a bidirectional switching power supply apparatus by using regenerative operation.

Also, in the switching power supply apparatus of the present invention, if the state is such that the current of the output choke coil as a regenerative current is changed across zero even during regenerative operation, no recovery current flows through the parasitic diodes of the main switching element and the commutation element, and thus no surge voltage occurs. Also, since drawing from the parasitic capacitances of the main switching element and the commutation element is performed, soft switching operation can be achieved. With this, a bidirectional switching power supply apparatus with high efficiency and low noise can be achieved.

Also, even if a large regenerative current flows, the commutation element is not turned ON while a current is flowing through the parasitic diode of the main switching element, and thus no surge voltage is generated. Also, without occurrence of a surge voltage, a semiconductor element such as a MOS-FET with low withstand voltage and low conduction resistance can be used as the main switching element and the commutation element, and a switching power supply apparatus with low noise and high efficiency and having a regenerative function can be achieved.

Also, since a peak value of the regenerative current of the output choke coil is limited by ON time of the commutation element so as not to become equal to or larger than one cycle of switching, a regenerative overcurrent protecting function, which is a function of inhibiting an excessive regenerative current from flowing, is also provided.

BRIEF DESCRIPTION OF THE DRAWINGS

FIG. 1 is a circuit block diagram depicting an embodiment of a switching power supply apparatus which functions as an insulation-type converter.

FIG. 2 is a descriptive diagram depicting operating waveforms when an output current is 0 for FIG. 1.

FIG. 3 is a descriptive diagram depicting circuit operation of one switching cycle when the output current is 0, as divided into periods A to F.

FIG. 4 is a descriptive diagram depicting operating waveforms when the output current is large for FIG. 1.

FIG. 5 is a descriptive diagram depicting circuit operation of one switching cycle when the output current is large, as divided into the periods A to F.

FIG. 6 is a circuit block diagram depicting an embodiment of a switching power supply apparatus including a surge voltage preventing function with respect to excessive output current.

FIG. 7 is a descriptive diagram depicting operating waveforms when a surge voltage preventing function with respect to excessive output current is absent.

FIG. 8 is a descriptive diagram depicting circuit operation in periods G and H in which the output current exceeds a rated current in the embodiment of FIG. 1 where the surge voltage preventing function with respect to excessive output current is not provided.

FIG. 9 is a descriptive diagram depicting operating waveforms of the embodiment of FIG. 6 where the surge voltage preventing function with respect to excessive output current is provided.

FIG. 10 is a descriptive diagram depicting circuit operation in a period I in which ON of a main switching element of FIG. 9 is retained.

FIG. 11 is a circuit block diagram depicting an embodiment of a switching power supply apparatus including the surge voltage preventing function and an overcurrent protecting function with respect to excessive output current.

FIG. 12 is a descriptive diagram depicting operating waveforms in a case in which a regenerative current is equal to or smaller than the rated current and in a case in which the regenerative current exceeds the rated current, when the surge voltage preventing function with respect to excessive regenerative current is absent.

FIG. 13 is a descriptive diagram depicting circuit operation in periods J and K and periods L and M of FIG. 12.

FIG. 14 is a circuit block diagram depicting an embodiment of a switching power supply apparatus including a surge voltage preventing function and a regenerative overcurrent protecting function with respect to excessive regenerative current.

FIG. 15 is a descriptive diagram depicting operating waveforms of the embodiment of FIG. 14.

FIG. 16 is a descriptive diagram depicting circuit operation in a period N in which ON of a commutation element of FIG. 15 is retained.

FIG. 17 is a circuit block diagram depicting a conventional single-ended forward converter.

FIG. 18 is a circuit block diagram depicting a conventional LLC resonant converter.

DETAILED DESCRIPTION OF THE INVENTION

[Structure of Switching Power Supply Apparatus]

FIG. 1 is a circuit block diagram depicting an embodiment of a switching power supply apparatus which functions as an insulation-type converter.

(Power Circuit)

As depicted in FIG. 1, in the switching power supply apparatus of the present embodiment, a synchronous rectification step-up/down chopper circuit 10 is provided as a power circuit on a primary side. The synchronous rectification step-up/down chopper circuit 10 connects, in parallel with an input power supply 12, a series circuit including a main switching element 14 using a MOS-FET and a chock coil 18 and connects, in parallel with the choke coil 18, a series circuit including a buffer capacitor 20 and a commutation element 16 using a MOS-FET.

As a power circuit on a secondary side of the switching power supply apparatus, a circuit structure is such that a secondary winding 22 is provided to the choke coil 18, a series circuit including a rectifying element 26 using a diode and an output capacitor 24 is connected to the secondary winding 22, and output electric power of a load 28 is obtained from both ends of the output capacitor 24.

The choke coil 18 has a period of operating as an inductor and a period of operating as a transformer. When operating as a transformer, the choke coil 18 serves as a primary winding of the transformer. In the following description, the choke coil 18 when operating as a transformer is represented as a choke coil (primary winding) 18.

Also, due to the MOS-FET semiconductor element structure, the main switching element 14 and the commutation element 16 have parasitic diodes 60 and 64 and parasitic capacitances 62 and 66, respectively, generated in parallel with a space between the source and the drain of each element.

Note that while the main switching element 14 is disposed on a high side in the present embodiment, it may be disposed on a low side. Also, the choke coil 18 and the buffer capacitor 20 may be disposed so as to change their places as long as they are connected in series. Similarly, the rectifying element 26 and the output capacitor 24 may be disposed so as to change their places as long as they are connected in series.

The synchronous rectification step-up/down chopper circuit 10 on the primary side accumulates excitation energy in the choke coil 18 when the main switching element 14 is in an ON state. And, when the commutation element 16 is in an ON state (the main switching element 14 is in an OFF state), the excitation energy of the choke coil 18 and electric charge energy of the buffer capacitor 20 are transmitted from the secondary winding 22 of the choke coil 18 to a load 28 side. Here, part of the excitation energy of the choke coil 18 is transmitted to the buffer capacitor 20.

When the commutation element 16 is in an ON state, the choke coil 18 operates as a flyback transformer, thereby discharging excitation energy accumulated when the main switching element 14 is in an ON state and, simultaneously, operating as a forward transformer which transmits energy of the buffer capacitor 20 to the secondary side.

That is, the switching power supply apparatus performs operation of accumulating energy in the choke coil 18 in a period in which the main switching element 14 is in an ON state and the commutation element 16 is in an OFF state and transmitting the energy accumulated in the choke coil 18 and the buffer capacitor 20 to the output capacitor 24 in a period in which the commutation element 16 is in an ON state and the main switching element 14 is in an OFF state.

The choke coil 18 operating as a transformer is in a state with the primary winding and the secondary winding 22 coupled by the choke coil 18, and therefore the buffer capacitor 20 and the output capacitor 24 are in a state of being coupled. Therefore, the voltage of each capacitor has a value proportional with a turns ratio between wire turns N1 of the choke coil (primary winding) 18 operating as a transformer and wire turns N2 of the secondary winding 22 (N2/N1).

Since the power circuit on the primary side of the switching power supply apparatus configures the synchronous rectification step-up/down chopper circuit 10 with respect to the buffer capacitor 20, a voltage VCb of the buffer capacitor 20 can be found by using a general formula for finding an output voltage of a synchronous rectification step-up/down chopper circuit, and is determined by an input voltage Vin and on-duty duty of the main switching element 14 and represented as in Equation (1).

[Equation 1]

$$VCb = \frac{Vin \cdot duty}{1-duty} \quad (1)$$

VCb: voltage of the buffer capacitor 20
Vin: input voltage
duty: on-duty of the main switching element 14

Since the buffer capacitor 20 and the output capacitor 24 each have a value proportional with the turns ratio between the wire turns N1 of the choke coil (primary winding) 18 operating as a transformer and the wire turns N2 of the secondary winding 22 (N2/N1), an output voltage Vo of the switching power supply apparatus is determined by

[Equation 2]

$$Vo = VCo = \frac{N2}{N1} \cdot \frac{Vin \cdot duty}{1-duty} \quad (2)$$

Vo: output voltage of the switching power supply apparatus
VCo: voltage of the output capacitor 24
N1: wire turns of the choke coil (primary winding) 18
N2: wire turns of the secondary winding 22

(Switching Control Circuit)

A switching control circuit 30 is configured of a switching frequency generation circuit 32, a triangular wave generation circuit 34, a PWM circuit (pulse width modulation circuit) 36, a first deadtime generation circuit 38, a second deadtime generation circuit 40, and a commutation control inverter 42.

The switching frequency generation circuit 32 includes an oscillation circuit 31, and outputs a clock signal E1 with a predetermined switching frequency fsw.

The triangular wave generation circuit 34 includes a switching element 44 using a MOS-FET and a charge/discharge circuit with a resistor 46 and a capacitor 48 connected in series, turns the switching element 44 OFF at a falling edge of the pulse signal E1 of the oscillation circuit 31 to a L level to charge the capacitor 48 via the resistor 46 and generate a linearly-increasing signal voltage, and subsequently turns the switching element 44 ON at a rising edge of the pulse signal E1 of the oscillation circuit 31 to a H level to reset and discharge the capacitor 48, thereby generating a triangular wave signal E2 repeated in an oscillation cycle of the oscillation circuit 31.

The PWM circuit 36 has inputted thereto a duty control signal E3 serving as a differential voltage between the output voltage and a predetermined reference voltage and the triangular wave signal E2 from the triangular wave generation circuit 34, outputs a PWM signal E4 with on-duty in accordance with the signal level of the duty control signal E3, and controls ON/OFF of the main switching element 14.

The PWM signal E4 from the PWM circuit 36 is inputted to the commutation control inverter 42 via the first deadtime generation circuit 38 and, with a commutation control signal E7 inversed at the commutation control inverter 42, causes ON/OFF control of the commutation element 16 complementarily with respect to ON/OFF control of the main switching element 14.

The first deadtime generation circuit 38 is a delay circuit with a resistor 54 and a capacitor 56 connected in series, outputs a delay signal E6 obtained by delaying the PWM signal E4 by a predetermined time to the commutation control inverter 42, and outputs a commutation control signal E7 which becomes at a H level after delay in which the delay signal E6 is below a threshold level of the commutation control inverter 42, thereby providing a predetermined first deadtime between OFF of the main switching element 14 and ON of the commutation element 16.

The second deadtime generation circuit 40 includes an oscillation circuit 50 and a diode 52, synchronizes frequencies of the oscillation circuit 31 and the oscillation circuit 50, outputs a pulse signal E5 from the oscillation circuit 50 immediately before the pulse signal E1 of the oscillation circuit 31 is generated to generate a predetermined second deadtime, and provides the second deadtime between OFF of the commutation element 16 and ON of the main switching element 14.

(Inductance of Choke Coil)

In the switching power supply apparatus of the present embodiment, an inductance Lp of the choke coil (primary winding) 18 is set as in Equation (3) so that, irrespectively of the output current, in one cycle of switching, the current flowing through the choke coil 18 flows in both positive and negative directions across zero and the current of the choke coil 18 flows toward the input power supply 12 at a timing when the main switching element 14 is turned ON.

[Equation 3]

$$Lp < \frac{Vin^2 \cdot Vo \cdot N1^2}{2fsw \cdot IoMAX \cdot (Vin \cdot N2 + Vo \cdot N1)^2} \quad (3)$$

Lp: inductance of the choke coil (primary winding) 18
fsw: switching frequency
IoMAX: maximum output current (rated value) of the switching power supply apparatus By setting this inductance Lp and providing the first deadtime and the second deadtime to the main switching element 14 and the commutation element 16 for driving, the main switching element 14 and the commutation element 16 can be caused to perform soft switching operation, and a switching power supply apparatus with high efficiency and low noise can be achieved. Also, since switching operation can be made with a fixed frequency and, furthermore, the output voltage can be controlled by on-duty of the main switching element 14, the switching control circuit 30 can also be achieved inexpensively and easily.

[Operation of Switching Power Supply Apparatus]

(Operation when Output Current is Zero)

FIG. 2 is a descriptive diagram depicting operating waveforms when the output current is 0 for FIG. 1, and FIG. 3 is a descriptive diagram depicting circuit operation of one switching cycle when the output current is 0, as divided into periods A to F.

Here, FIG. 2 depicts, in its (a) to (l), the pulse signal E1 of the oscillation circuit 31, the pulse signal E5 of the oscillation circuit 50, the triangular wave signal E2 and the duty control signal E3 inputted to the PWM circuit 36, the PWM signal E4 outputted from the PWM circuit 36, the delay signal E6 of the first deadtime generation circuit 38, a gate-source voltage VGS1 of the main switching element 14, a gate-source voltage VGS2 of the commutation element 16, a drain-source voltage VDS1 of the main switching element 14, a drain-source voltage VDS2 of the commutation element 16, an end-to-end voltage VKA of the rectifying element 26, a current I of the rectifying element 26, and a choke coil current IL of the choke coil 18. Also, FIG. 3 depicts circuit operation in one cycle at times t1 to t2 of switching for FIG. 2, as divided into six periods of A to F.

In the switching power supply apparatus of the present embodiment, when no output current flows due to no load, no current flows through the secondary winding 22. Therefore, the power circuit on the primary side can be thought as a synchronous rectification step-up/down chopper circuit 10 with both ends of the buffer capacitor 20 being taken as outputs.

The switching power supply apparatus of the present embodiment is controlled by separately excited type by the switching frequency generation circuit 32. The voltage VCb of the buffer capacitor 20 in the synchronous rectification step-up/down chopper circuit 10 with the switching frequency fsw being fixed is determined by the input voltage Vin and the on-duty duty of the main switching element 14, and is represented as the following Equation (4) as the above-described Equation (1).

[Equation 4]

$$VCb = \frac{Vin \cdot \text{duty}}{1 - \text{duty}} \quad (4)$$

Also, when the output voltage Io is zero, an average value of a current ICb flowing through the choke coil 18 is zero. Also, the buffer capacitor 20 and the output capacitor 24 have a relation of a multiple of the turns ratio between the wire turns N1 of the choke coil (primary winding) 18 and the wire turns N2 of the secondary winding 22.

When the switching power supply apparatus is operating without load, in a state in which the current of the choke coil 18 is oriented to a plus direction, the main switching element 14 is turned OFF, as depicted in the last of the period A. After the main switching element 14 is turned OFF, the period B of a first deadtime when both of the main switching element 14 and the commutation element 16 are turned OFF is provided. Thus, electric charges accumulated in the parasitic capacitance 66 of the commutation element 16 are collected.

At a timing of the start of the period C when the commutation element 16 is turned ON, since electric charges of the parasitic capacitance 66 are drawn, the commutation element 16 can perform soft switching operation.

At a timing of the last of the period C when the commutation element 16 is turned OFF, the current of the choke coil 18 is oriented to a minus direction.

After the commutation element 16 is turned OFF, the period E of a second deadtime when both of the main switching element 14 and the commutation element 16 are turned OFF is provided. Thus, electric charges accumulated in the parasitic capacitance 62 of the main switching element 14 are collected. At a timing of the start of the period F when the main switching element 14 is turned ON, since electric charges of the parasitic capacitance 62 are drawn, the main switching element 14 can perform soft switching operation.

The operations in these periods A to F are further described in detail as follows.

(Operation in Period A)

When an output current Io is zero, as depicted in the period A of FIG. 2, with VGS1 of FIG. 2(f) being at a H level, the main switching element 14 is in an ON state. Also, with VGS2 of FIG. 2(g) being at a L level, the commutation element 16 is in an OFF state. The choke coil current IL of FIG. 2(l) is oriented to a plus direction to increase.

Here, as indicated by an arrow in (period A) of FIG. 3, a current flows via a route from a plus side of the input power supply 12 to the main switching element 14, the choke coil 18, and a minus side of the input power supply 12, and energy is accumulated in the choke coil 18.

When the triangular wave signal E2 depicted in FIG. 2 (c) crosses the level of the duty control signal E3 in the period A, the PWM signal E4 of FIG. 2(d) rises from a H level to a L level, VGS1 of FIG. 2(f) becomes at a L level from a H level, and the main switching element 14 is turned OFF as depicted at the last of the period A.

(Operation in Period B)

After the main switching element 14 is turned OFF, the period B of a first deadtime when both of the main switching element 14 and the commutation element 16 are turned OFF is provided. Here, since the choke coil 18 operates so as to try to let the choke coil current IL continuously flow, a side of the choke coil 18 indicated by a dot becomes to have a plus polarity, and the opposite side becomes to have a minus polarity. Therefore, as indicated by an arrow in (period B) of FIG. 3, a current by energy release of the choke coil 18 flows via a route from the plus side of the choke coil 18 indicated by the dot to the buffer capacitor 20, the parasitic capacitance 66 of the commutation element 16, and the minus side of the choke coil 18. Thus, electric charges accumulated in the parasitic capacitance 66 of the commutation element 16 are drawn in the period B of the first deadtime.

(Operation in Period C)

At a timing when the first deadtime in the period B passes and VGS2 of FIG. 2 (g) rises from a L level to a H level to turn the commutation element 16 ON, since electric charges of the parasitic capacitance 66 of the commutation element 16 are drawn in the period B, the commutation element 16 can be turned ON by soft switching operation at the start of the period C.

That is, since the parasitic capacitance 66 is in a discharge state, the drain-source voltage VDS2 of the commutation element 16 is a zero volt and, in this state, soft switching operation of turning the commutation element 16 ON can be performed.

When the commutation element 16 is turned ON, as depicted in (period C) of FIG. 3, the choke coil current IL by energy release of the choke coil 18 flows via a route from the plus side of the choke coil 18 indicated by the dot to the buffer capacitor 20, the commutation element 16, and the minus side of the choke coil 18, and the choke coil current IL linearly decreases.

Here, the choke coil (primary winding) 18 and the secondary winding 22 operate forward transformers as well as flyback transformers and, as depicted in FIGS. 2(j) and (k), the rectifying element 26 is turned ON by a voltage induced by the secondary winding to cause the end-to-end voltage VKA to become approximately zero. However, no load current flows due to a no-load state, the current I of the rectifying element 26 is zero.

(Operation in Period D)

In the period C, in a state in which the main switching element 14 is in an OFF state and the commutation element 16 is in an ON state, when the current of the choke coil 18 decreases to fall below zero, the operation enters the period D in which the current direction becomes a minus direction.

Here, as depicted in (period D) of FIG. 3, a current flows so that energy is accumulated in the choke coil 18 via a route from a plus side of the buffer capacitor 20 to the choke coil 18, the commutation element 16, and a minus side of the buffer capacitor 20. As depicted in FIG. 2(l), the choke coil current IL linearly increases to a minus direction, but no load current flows to a secondary side.

When the last of the period D approaches, by the pulse signal E5 of the oscillation circuit 50 depicted in FIG. 2 (b), VGS2 of FIG. 2 (g) becomes at a L level from a H level, and the commutation element 16 is turned OFF as depicted at the last of the period D.

(Operation in Period E)

After the commutation element 16 is turned OFF, the period E of a second deadtime when both of the main switching element 14 and the commutation element 16 are turned OFF is provided. Here, since the choke coil 18 operates so as to try to let the choke coil current IL continuously flow, a side of the choke coil 18 without a dot becomes to have a plus polarity, and a side indicated by a dot becomes to have a minus polarity.

Therefore, as indicated by an arrow in (period E) of FIG. 3, a current by energy release of the choke coil 18 flows via a route from the plus side of the choke coil 18 to the parasitic capacitance 62 of the main switching element 14, the input power supply 12, and the minus side of the choke coil 18 indicated by the dot. Thus, electric charges accumulated in the parasitic capacitance 62 of the main switching element 14 are collected in the period E of the second deadtime.

(Operation in Period F)

At a timing when the second deadtime in the period E passes and VGS1 of FIG. 2(f) rises from a L level to a H level to turn the main switching element 14 ON, since electric charges of the parasitic capacitance 62 of the main switching element 14 are collected in the period E, the main switching element 14 can be turned ON by soft switching operation at the start of the period F.

That is, since the parasitic capacitance 62 is in a discharge state, the drain-source voltage VDS1 of the main switching element 14 is zero volt and, in this state, soft switching operation of turning the main switching element 14 ON can be performed.

When the main switching element 14 is turned ON, as depicted in (period F) of FIG. 3, a current by energy release of the choke coil 18 flows via a route from the plus side of the choke coil 18 to the main switching element 14, the input power supply 12, and the minus side of the choke coil 18 indicated by the dot and, as depicted in the period F of FIG. 2(l), the choke coil current IL linearly changes from the minus direction toward zero.

(Operation when Output Current is Large)

FIG. 4 is a descriptive diagram depicting operating waveforms when the output current is large for FIG. 1, as divided into FIG. 4(a) to (l) as with FIG. 2(a) to (l). FIG. 5 is a descriptive diagram depicting circuit operation of one switching cycle when the output current is large, as divided into the periods A to F.

When the output current of the switching power supply apparatus is large, what is different from a case in which the output current is zero is that the output current flows to the secondary side in the period C and the period D.

In the period C and the period D, as for the primary side, a current with the current flowing to the secondary side superposed on the current flowing through the choke coil (primary winding) 18 flows. When the output current is zero, the average value of the current on the primary side is zero. However, when the output current is large, as the current increases, the average value of the current on the primary side moves to a plus side.

Operations in the period C and the period D when the output current is large are described in detail as follows.

(Operation in Period C)

At a timing when the first deadtime in the period B passes and VGS2 of FIG. 4 (g) rises from a L level to a H level to turn the commutation element 16 ON, since electric charges of the parasitic capacitance 66 of the commutation element 16 are drawn in the period B, the commutation element 16 can be turned ON by soft switching operation at the start of the period C.

That is, since the parasitic capacitance 66 is in a discharge state, the drain-source voltage VDS2 of the commutation element 16 is zero volt and, in this state, soft switching operation of turning the commutation element 16 ON can be performed.

When the commutation element 16 is turned ON, as depicted in (period C) of FIG. 5, the choke coil current IL by energy release of the choke coil 18 flows via a route from the plus side of the choke coil 18 indicated by a dot to the buffer capacitor 20, the commutation element 16, and the minus side of the choke coil 18.

Here, the choke coil (primary winding) 18 and the secondary winding 22 operate as flyback transformers, and excitation energy of the choke coil 18 is transmitted from the secondary winding 22 of the choke coil 18 to a load 28 side. Here, at the same time, the choke coil (primary winding) 18 and the secondary winding 22 are operating also as forward transformers, and electric charge energy of the buffer capacitor 20 is transmitted from the secondary winding 22 of the choke coil 18 to the load 28 side. By the rectifying element 26 and the output capacitor 24 rectifying and smoothing electric power transmitted with flyback operation and forward operation of the choke coil (primary winding) 18 and the secondary winding 22, output electric power is generated, and a load current flows through the load 28. In the period C, the forward operation as well as the flyback operation causes energy to be transmitted to the load 28 side. Conversely to the period D described below, however, the contribution ratio of flyback operation is larger than the contribution ratio of forward operation.

Also, the current IL flowing through the choke coil 18 becomes a current with the current I flowing through the rectifying element 26 on the secondary side superposed on the current flowing through the choke coil (primary winding) 18, and the choke coil current IL linearly decreases after dropping in a stepwise manner.

(Operation in Period D)

In the period C, in a state in which the main switching element 14 is in an OFF state and the commutation element 16 is in an ON state, when the current of the choke coil 18 decreases to fall below zero, the operation enters the period D in which the current direction becomes a minus direction.

Here, as depicted in (period D) of FIG. 5, a current (a current with the secondary-side current superposed on the primary-side choke coil current) flows so that energy is accumulated in the choke coil 18 via a route from the plus side of the buffer capacitor 20 to the choke coil 18, the commutation element 16, and the minus side of the buffer capacitor 20. As depicted in FIG. 4(l), the choke coil current IL linearly increases to a minus direction.

Also, the choke coil (primary winding) 18 and the secondary winding 22 continue to operate as flyback transformers as well as forward transformers. Excitation energy of the choke coil 18 and electric charge energy of the buffer capacitor 20 are transmitted from the secondary winding 22 of the choke coil 18 to a load 28 side. By the rectifying element 26 and the output capacitor 24 rectifying and smoothing electric power transmitted with flyback operation and forward operation of the choke coil (primary winding) 18 and the secondary winding 22, output electric power is generated, and a load current flows through the load 28. Also in the period D, energy is transmitted to the load 28 side with forward operation simultaneously with flyback operation. Conversely to the above-described period C, energy transmitted to the load 28 side has a contribution ratio of forward operation larger than the contribution ratio of flyback operation.

When the last of the period D approaches, by the pulse signal E5 of the oscillation circuit 50 depicted in FIG. 4 (b), VGS2 of FIG. 4 (g) becomes at a L level from a H level, and the commutation element 16 is turned OFF as depicted at the last of the period D.

In the switching power supply apparatus of the present embodiment, even if the output current is large, as with the case in which the output current is zero, the main switching element 14 is turned OFF when the current of the choke coil (primary winding) 18 is oriented to a plus direction and then a first deadtime of the period B is provided for ON of the commutation element 16, thereby drawing electric charges accumulated in the parasitic capacitance 66 of the commutation element 16.

Also, the commutation element 16 is turned OFF when the current of the choke coil (primary winding) 18 is oriented to a minus direction and then a second deadtime of the period E is provided for ON of the main switching element 14, thereby drawing electric charges accumulated in the parasitic capacitance 62 of the main switching element 14.

Thus, even of the load current is large, operation of providing the first deadtime and the second deadtime is provided, and also the inductance Lp of the choke coil (primary winding) is set as described below. With this, as with the case in which the output current is zero depicted in FIG. 2 and FIG. 3, the main switching element 14 and the commutation element 16 can be subjected to soft switching.

(Inductance Lp of Choke Coil)

The switching power supply apparatus of the present embodiment accumulates excitation energy in the choke coil 18 when the main switching element 14 is in an ON state (the commutation element 16 is in an OFF state). Then, when the commutation element 16 is in an ON state (the main switching element 14 is in an OFF state), the excitation energy of the choke coil 18 and the electric charge energy of the buffer capacitor 20 are transmitted from the secondary winding 22 of the choke coil 18 to the output capacitor 24 on a load side.

When the commutation element 16 is in an ON state, the choke coil 18 operates as a flyback transformer which releases excitation energy accumulated when the main switching element 14 is in an ON state and, at the same time, operates as a forward transformer which transmits energy of the buffer capacitor 20 to the secondary side.

Here, the excitation energy of the choke coil 18 transmitted to the secondary side can be thought to be equivalent to that transmitted to the output capacitor 24 on the secondary side after all energy is once accumulated in the buffer capacitor 20.

Therefore, the load current as the switching power supply apparatus is equal to energy outputted by the synchronous rectification step-up/down chopper circuit 10 on the primary side to the buffer capacitor 20. Thus, by determining a current of the choke coil 18 by considering the synchronous rectification step-up/down chopper circuit 10 with both ends of the buffer capacitor 20 regarded as outputs, a current to be outputted by the switching power supply apparatus to the secondary side can be determined.

A virtual maximum output current (predetermined rated value) of the synchronous rectification step-up/down chopper circuit 10 with both ends of the buffer capacitor 20 regarded as outputs is assumed to be ICbMAX. Also, a current amplitude (current change amount) of the choke coil 18 when regarded as operating as the synchronous rectification step-up/down chopper circuit 10 is taken as ΔIL.

As a condition for soft switching, when the main switching element 14 is turned ON, the current IL of the choke coil 18 has to be surely oriented to the minus direction. From this, the current amplitude ΔIL of the choke coil 18 has to be surely set across zero. Here, since a virtual output current ICb of the synchronous rectification step-up/down chopper circuit 10 is an average value of a current flowing through the choke coil 18 when the main switching element 14 is in an OFF state, the current amplitude ΔIL of the choke coil 18 is set so that this average value is larger than the virtual maximum output current ICbMAX of the synchronous rectification step-up/down chopper circuit 10. With this, in a case in which the virtual output current of the synchronous rectification step-up/down chopper circuit 10 is equal to or smaller than the virtual maximum output current ICbMAX, the current amplitude ΔIL of the choke coil 18 surely becomes operation across zero. From here, as in Equation (5), a minimum value of the current change amount (current amplitude) ΔIL of the choke coil can be found as in Equation (5).

[Equation 5]

$$\tfrac{1}{2}\Delta IL(1-\text{duty}) > ICb\text{MAX} \tag{5}$$

The current amplitude ΔIL of the choke coil 18 is determined by a voltage VL to be applied to the choke coil 18, an application time Ton, and the inductance Lp, as in the next equation.

[Equation 6]

$$\Delta IL = \frac{1}{Lp}\int_0^{Ton} VL\,dt \tag{6}$$

The voltage VL to be applied to the choke coil 18 is the input voltage Vin.

[Equation 7]

$$VL = Vin \tag{7}$$

The time Ton during which the voltage VL is applied to the choke coil 18 is an ON time of the main switching element 14, can be found from the switching frequency fsw and the duty, and is given by the following equation.

[Equation 8]

$$Ton = \frac{1}{fsw}\,\text{duty} \tag{8}$$

The duty of the main switching element 14 can be found by finding duty of the synchronous rectification step-up/down chopper circuit, and therefore is found from the input voltage Vin and the buffer capacitor voltage VCb, as in the following equation.

[Equation 9]

$$\text{duty} = \frac{VCb}{Vin + Vcb} \tag{9}$$

Next, a relation between the output current Io to be outputted to a secondary side as the switching power supply apparatus and the current of the choke coil 18 of the primary-side circuit is considered.

The switching power supply apparatus of the present embodiment transmits energy accumulated in the buffer capacitor 20 to the output capacitor 24 in a period when the commutation element 16 is in an ON state. Therefore, energy Pout to be outputted to the load is the same as energy PCb to be supplied to the buffer capacitor 20.

Since energy is the product of voltage and current, when a case in which the output current Io is the maximum output current IoMAX is considered, energy to be supplied to the buffer capacitor 20 is the product of the voltage VCb of the buffer capacitor 20 and the maximum value ICbMAX of the current flowing through the choke coil (primary winding) 18. Also, energy to be outputted by the switching power supply apparatus is the product of the output voltage Vo and the maximum output current IoMAX, and a relation in Equation (10) can be obtained.

[Equation 10]

$$Pout = Vo \cdot IoMAX = PCb = VCb \cdot ICbMAX \tag{10}$$

The voltage VCb of the buffer capacitor 20 and the output voltage Vo have a relation of the turns ratio between the wire turns N1 of the choke coil (primary winding) 18 and the wire turns N2 of the secondary winding 22, and therefore a relation in Equation (11) can be obtained.

[Equation 11]

$$VCb = \frac{N1}{N2}Vo \tag{11}$$

Thus, from Equation (10) and Equation (11), the following Equation (12) can be obtained.

[Equation 12]

$$Vo \cdot IoMAX = \frac{N1}{N2} Vo \cdot ICbMAX \quad (12)$$

Thus, by rearranging Equation (12), a relation between the maximum output current IoMAX of the switching power supply apparatus and the virtual maximum output current ICbMAX of the synchronous rectification step-up/down chopper circuit 10 on the primary side can be obtained as in the following Equation (13).

[Equation 13]

$$IoMAX = \frac{N1}{N2} ICbMAX \quad (13)$$

From the above relational expressions, the inductance Lp of the choke coil 18 is found, thereby obtaining the above Equation (3) again presented below.

[Equation 14]

$$Lp < \frac{Vin^2 \cdot Vo \cdot N1^2}{2fsw \cdot IoMAX \cdot (Vin \cdot N2 + Vo \cdot N1)^2} \quad (3)$$

Lp: inductance of the choke coil (primary winding) 18
Vin: input voltage
VCb: voltage of the buffer capacitor 20 (output voltage when the apparatus is considered as the synchronous rectification step-up/down chopper circuit 10)
ICbMAX: maximum output current when the apparatus is considered as the synchronous rectification step-up/down chopper circuit 10
fsw: switching frequency As a result, by setting the inductance Lp of the choke coil (primary winding) 18 as in Equation (3), the main switching element 14 and the commutation element 16 can be caused to perform soft switching operation in a range of the output current Io of the switching power supply apparatus from zero to the rated current.

(Usability of Switching Power Supply Apparatus of FIG. 1)

The switching power supply apparatus depicted in FIG. 1 can achieve, with a simple structure, soft switching operation of a semiconductor element such as a MOS-FET provided as the main switching element 14 and the commutation element 16, and can be operated with a fixed frequency even if the input voltage, output voltage, output current, and so forth are changed.

Also, since a surge voltage, which is a problem of the conventional single-ended forward converter depicted in FIG. 17, does not occur, a semiconductor element with low withstand voltage (semiconductor element with small on-resistance) can be used. Thus, the apparatus can contribute to high efficiency and, furthermore, can also reduce switching noise.

Also, since frequency modulation control, which is required in the LLC resonant converter depicted in FIG. 18, is not required, the switching control circuit 30 can be configured at low cost. Because of operating at the fixed frequency, the apparatus does not have an adverse effect such as measurement error if used as measurement equipment.

Furthermore, if the inductance Lp of the choke coil (primary winding) 18 is set so as to satisfy Equation (3), unlike the LLC resonant converter, excessive stress is not applied to the switching element even if the input voltage, output voltage, load current, and so forth are changed.

Embodiment for Preventing Surge Voltage with Respect to Excessive Output Current (Structure of Switching Power Supply Apparatus)

FIG. 6 is a circuit block diagram depicting an embodiment of a switching power supply apparatus including a surge voltage preventing function with respect to excessive output current. The switching power supply apparatus of FIG. 6 has, in addition to the features of the switching power supply apparatus of FIG. 1, a feature of not generating a surge voltage even if a current equal to or larger than the maximum output current IoMAX flows.

As depicted in FIG. 6, in the switching power supply apparatus of the present embodiment, a synchronous rectification step-up/down chopper circuit 10 provided as a power circuit on a primary side connects, in parallel with an input power supply 12, a series circuit including a main switching element 14 using a MOS-FET and a choke coil 18 and connects, in parallel with the choke coil 18, a series circuit including a buffer capacitor 20 and a commutation element 16 using a MOS-FET.

Also, as a power circuit on a secondary side, a circuit structure is such that a secondary winding 22 is provided to the choke coil 18 corresponding to a primary winding, a series circuit including a rectifying element 26 using a diode and an output capacitor 24 is connected to the secondary winding 22, and output electric power of a load 28 is obtained from both ends of the output capacitor 24. Note that a parasitic diode and a parasitic capacitance generated in parallel with a space between the source and the drain of each of the main switching element 14 and the commutation element 16 are omitted.

A switching control circuit 30 is configured of a switching frequency generation circuit 32, a triangular wave generation circuit 34, a PWM circuit (pulse width modulation circuit) 36, a first deadtime generation circuit 38, a second deadtime generation circuit 40, and a commutation control inverter 42.

Although these structures are identical to those of the embodiment of FIG. 1, a polarity detection circuit 70 and a main switching element ON-retention control circuit 74 are added in the present embodiment.

The polarity detection circuit 70 includes a polarity detection coil 72 coupled to the choke coil 18, and detects the polarity of a voltage occurring in the choke coil 18 and outputs a polarity detection signal E8. That is, the polarity detection circuit 70 outputs the polarity detection signal E8 which becomes at a L level when a plus voltage occurs on a side of the choke coil 18 indicated by a dot, and outputs the polarity detection signal E8 which becomes at a H level when a plus voltage occurs on a side of the choke coil 18 opposite to the side indicated by the dot.

When a plus voltage is generated by the polarity detection circuit 70 on the side of the choke coil 18 indicated by the dot and the polarity detection signal E8 at a L level is outputted, the main switching element ON-retention control circuit 74 performs control so as to fix a PWM signal E4 being at a H level outputted by the switching control circuit 30 to a L level and retain ON of the main switching element 14 and continues OFF.

(Operation when Surge Voltage Preventing Function is Absent)

As for the embodiment of FIG. 1 with the polarity detection circuit 70 and the main switching element ON-retention control circuit 74 not provided as in the embodiment of FIG. 6, operation when the output current Io equal to or larger than the maximum output current IoMAX flows is described based on FIG. 7 and FIG. 8.

FIG. 7 is a descriptive diagram depicting operating waveforms when a surge voltage preventing function with respect to excessive output current is absent, with signals of respective parts depicted as divided into FIG. 7(a) to (j). FIG. 8 is a descriptive diagram depicting circuit operation in periods G and H in which the output current of FIG. 1 exceeds a rated current.

(Operation in Period A)

As depicted in FIG. 7(c), with the load 28 requesting large current and the output current Io equal to or larger than the maximum output current IoMAX flowing, the signal voltage of the duty control signal E3 rises to prolong a period until the triangular wave signal E2 crosses the duty control signal E3. Thus, a period until the PWM signal of FIG. 7(d) rises from a H level to a L level is prolonged.

When large current flows through the load 28 as described above, on-duty of the main switching element 14 increases and, as indicated in the period A of FIG. 7(j), the choke coil current IL rises.

(Operation in Period B)

After the main switching element 14 is turned OFF, the period B of a first deadtime when both of the main switching element 14 and the commutation element 16 are turned OFF is provided. Thus, electric charges accumulated in the parasitic capacitance 66 of the commutation element 16 are drawn.

(Operation in Period C)

At a timing when the first deadtime in the period B passes and VGS2 of FIG. 7 (g) rises from a L level to a H level to turn the commutation element 16 ON, since electric charges of the parasitic capacitance 66 of the commutation element 16 are drawn in the period B, the commutation element 16 can be turned ON by soft switching operation. In the period C in which the commutation element 16 is in an ON state, the choke coil 18 releases energy, and the choke coil current IL decreases.

In this case, in a state in which the main switching element 14 is in an OFF state and the commutation element 16 is in an ON state, the choke coil current IL decreases. However, the state is such that the output current Io is larger than the maximum output current IoMAX, the choke coil current IL does not decrease to a value equal to or smaller than zero.

In this state, when the last of the period C approaches, by the pulse signal E5 of the oscillation circuit 50 depicted in FIG. 7 (b), VGS2 of FIG. 7(g) becomes at a L level from a H level, and the commutation element 16 is turned OFF as depicted at the last of the period C.

(Operation in Period G)

After the commutation element 16 is turned OFF, the period G of a second deadtime when both of the main switching element 14 and the commutation element 16 are turned OFF is provided. Here, since the state is such that the output current Io is larger than the maximum output current IoMAX, the choke coil current IL does not decrease to a value equal to or smaller than zero.

Thus, as indicated by an arrow in (period G) of FIG. 8, a current by energy release of the choke coil 18 flows via a route from the plus side of the choke coil 18 indicated by the dot to the buffer capacitor 20, the parasitic diode 64 of the commutation element 16 and the minus side of the choke coil 18.

(Operation in Period H)

With the second deadtime in the period G passing, VGS1 of FIG. 7(f) rises from a L level to a H level to turn the main switching element 14 ON. However, immediately after the main switching element 14 is turned ON, by recovery operation of the parasitic diode 64 of the commutation element 16, as indicated by an arrow in (period H) of FIG. 8, a large through current flows via a route of a plus side of the input power supply 12, the main switching element 14, the parasitic diode 64 of the commutation element 16, the buffer capacitor 20, and a minus side of the input power supply 12, energy is accumulated in a parasitic inductance by wiring, and this energy accumulated in the parasitic inductance causes a surge voltage Vs to be generated in the commutation element 16 as indicated by VSD2 of FIG. 7(i).

Thus, in the case of the embodiment of FIG. 1 without addition of the polarity detection circuit 70 and the main switching element ON-retention control circuit 74 as in FIG. 6, if the load requests large current, a state occurs in which the current of the choke coil 18 does not return to zero, and a surge voltage is generated in the commutation element 16.

(Operation when Surge Voltage Preventing Function is Present)

When the polarity detection circuit 70 and the main switching element ON-retention control circuit 74 are added as in the embodiment of FIG. 6, operation when the output current Io equal to or larger than the maximum output current IoMAX flows is described based on FIG. 9.

FIG. 9 is a descriptive diagram depicting operating waveforms when the surge voltage preventing function with respect to excessive output current is provided, with signals of respective parts depicted as divided into FIG. 9(a) to (k). To FIG. 6, the polarity detection signal E8 of FIG. 9(f) is added. FIG. 10 is a descriptive diagram depicting circuit operation in a period I in which ON of the main switching element of FIG. 9 is retained.

(Operation in Period A)

As depicted in FIG. 9(c), with the load 28 requesting large current and the output current Io equal to or larger than the maximum output current IoMAX flowing, the signal voltage of the duty control signal E3 increases, and a period until the triangular wave signal E2 crosses the feedback control signal E3 increases. Thus, a period until the PWM signal E4 of FIG. 9(d) falls from a H level to a L level is prolonged.

When large current flows through the load 28 as depicted above, on-duty of the main switching element 14 increases and, as depicted in the period A of FIG. 9(k), the choke coil current IL rises.

Here, since the polarity detection signal E8 outputted from the polarity detection circuit 70 is at a H level, the main switching element ON-retention control circuit 74 does not retain ON of the main switching element 14, and turns the main switching element 14 OFF in synchronization with the PWM signal E4 from the PWM circuit 36.

(Operation in Period B)

After the main switching element 14 is turned OFF, the period B of a first deadtime when both of the main switching element 14 and the commutation element 16 are turned OFF is provided. Thus, electric charges accumulated in the parasitic capacitance 66 of the commutation element 16 are drawn.

(Operation in Period C)

At a timing when the first deadtime in the period B passes and VGS2 of FIG. 9(h) rises from a L level to a H level to turn the commutation element 16 ON, since electric charges of the parasitic capacitance of the commutation element 16 are drawn in the period B, the commutation element 16 can be turned ON by soft switching operation. In the period C in which the commutation element 16 is in an ON state, the choke coil 18 releases energy, and the choke coil current IL decreases.

In this state, by the pulse signal E5 of the oscillation circuit 50 depicted in FIG. 9(b), VGS2 of FIG. 9(h) becomes at a L level from a H level, and the commutation element 16 is turned OFF as depicted at the last of the period C.

(Operation in Period G)

After the commutation element 16 is turned OFF, the period G of a second deadtime when both of the main switching element 14 and the commutation element 16 are turned OFF is provided. In the period G, a current by energy release of the choke coil 18 flows via a route from the plus side of the choke coil 18 indicated by the dot to the buffer capacitor 20, the parasitic diode 64 of the commutation element 16, and the minus side of the choke coil 18. The choke coil current IL continues to decrease and, at the same time, is transmitted from the secondary winding 22 of the choke coil 18 to the load 28 side to let a load current flow.

(Operation in Period I)

In the period I, the PWM signal E4 of FIG. 9(d) becomes at a H level to try to turn the main switching element 14 ON. Here, since the choke coil 18 is in a state of releasing energy, the polarity detection signal E8 from the polarity detection circuit 70 keeps in a state of being at a L level.

When the polarity detection signal E8 is in a state of being at a L level as described above, even if the PWM signal E4 becomes at a H level to turn the main switching element 14 ON, an AND circuit 76 of the main switching element ON-retention control circuit 74 becomes in a prohibited state by the polarity detection signal E8 at a L level to be fixed to L-level output, and the main switching element ON-retention control circuit 74 retains ON of the main switching element 14 and continues OFF.

Therefore, as with the period G, with the current flowing through the parasitic diode 64 of the commutation element 16, the choke coil 18 continuously releases energy toward the buffer capacitor 20 and the load 28, and the choke coil current IL continuously decreases.

When the choke coil 18 ends energy release, the polarity detection signal from the polarity detection circuit 70 becomes at a H level, and the prohibited state of the AND circuit 76 provided in the main switching element ON-retention control circuit 74 is cancelled. Here, since the PWM signal E4 is at a H level, the main switching element 14 is turned ON.

Also, at the last of the period I, after the choke coil current IL becomes zero, the main switching element 14 is turned ON. Therefore, after the current flowing through the parasitic diode 64 of the commutation element 16 becomes zero, the main switching element 14 is turned ON. In this case, since the state is not such that electric charges of the parasitic capacitance 66 of the commutation element 16 are drawn, soft switching operation is not performed. However, since the main switching element 14 is turned ON after the current flowing through the parasitic diode 64 becomes zero, recovery operation does not occur in the parasitic diode 64 of the commutation element 16, a through current as depicted in (period H) of FIG. 8 does not flow, and no surge voltage occurs in the commutation element 16.

(Usability of Switching Power Supply Apparatus of FIG. 6)

In the switching power supply apparatus depicted in FIG. 6, with the functions of the polarity detection circuit 70 and the main switching element ON-retention control circuit 74, even if the output current Io equal to or larger than the maximum output current IoMAX are tried to be let flow, the main switching element 14 is not turned ON while the current is flowing through the parasitic diode of the commutation element 16. Thus, no surge voltage is generated in the commutation element 16, an element with low with stand voltage and low conduction resistance can be used as a semiconductor element such as a MOS-FET for use as the commutation element 16, and a switching power supply apparatus with low noise and high efficiency can be achieved.

[Switching Power Supply Apparatus Including Overcurrent Protecting Function]

FIG. 11 is a circuit block diagram depicting an embodiment of a switching power supply apparatus including the surge voltage preventing function and an overcurrent protecting function with respect to excessive output current.

As depicted in FIG. 11, in the switching power supply apparatus of the present embodiment, a maximum duty limiting circuit 78 which functions as an output current limiting circuit is added to the switching power supply apparatus depicted in FIG. 6.

The maximum duty limiting circuit 78 includes an inverter 80 and an AND circuit 82, with the inverter 80 inverting the pulse signal E1 from the oscillation circuit 31 for input to one side of the AND circuit 82 and with the PWM signal E4 from the PWM circuit 36 inputted to the other side of the AND circuit 82. Control is performed so that a period is provided in which the main switching element 14 is surely turned OFF in one cycle of switching.

That is, the maximum duty limiting circuit 78 performs control so as to turn the main switching element 14 OFF when the pulse signal E1 from the oscillation circuit 31 rises from a L level to a H level, thereby inhibiting excessive output current from flowing. With this, the ON period of the main switching element 14 is not equal to or longer than one cycle of switching.

For further specific description, in the operation waveforms of FIG. 9, the state is described in which the duty control signal E3 crosses the triangular wave signal E2. With an increase of the output current Io, if the duty control signal E3 further increases, the state becomes such that crossing with the triangular wave signal E2 cannot be made and the main switching element 14 cannot be turned OFF, and the state becomes such that an increase of the choke coil current IL continues to let excessive current flow.

Thus, as depicted in FIG. 11, by providing the maximum duty limiting circuit 78, an upper limit of the ON period of the main switching element 14 can be determined. Also, since a current increase of the output current is limited by the maximum duty of the main switching element 14, it is possible to inhibit an excessive current from flowing through the switching power supply apparatus.

[Switching Power Supply Apparatus Including Regenerative Function]

The switching power supply apparatus depicted in FIG. 1 can achieve a function of regenerating electric power from an output side to an input side by changing the rectifying element 26 using a diode to a MOS-FET having a bidirectional rectifying function.

Regenerative operation occurs, for example, when a voltage higher than a voltage outputted by the switching power supply apparatus (output voltage setting value) is applied to an output side of the switching power supply apparatus or when the output voltage setting value is abruptly decreased in a state in which a large-capacity capacitor is attached to the output side. Also, in the present switching power supply apparatus, by actively using a regenerative phenomenon, a bidirectional switching power supply apparatus can be created.

In the switching power supply apparatus including the regenerative function, if the regenerative current is equal to or smaller than a maximum regenerative current IoMAX even during regenerative operation, no recovery current flows through the parasitic diodes of the main switching element 14 and the commutation element 16, and thus no surge voltage occurs. Also, since drawing from the parasitic capacitance is performed, soft switching operation can be achieved. With this, a bidirectional switching power supply apparatus with high efficiency and low noise can be created.

(Regenerative Operation of Switching Power Supply Apparatus)

Soft switching operation of the switching power supply apparatus including a regenerative function by changing the rectifying element 26 using a diode of FIG. 1 to a MOS-FET is described based on FIG. 12 and FIG. 13.

FIG. 12 is a descriptive diagram depicting operating waveforms in a case in which a regenerative current is equal to or smaller than the maximum regenerative current IoMAX and in a case in which the regenerative current exceeds the maximum regenerative current IoMAX, with signals of respective parts depicted as divided into FIG. 12(a) to (j). FIG. 13 is a descriptive diagram depicting circuit operation in periods J, K, L, and M in which the regenerative current of FIG. 12 exceeds the rated current.

(Operation when Regenerative Current is Equal to or Smaller than Maximum Regenerative Current IoMAX)

When an external voltage is applied to an output of the switching power supply apparatus including the regenerative function, a regenerative current flows. The switching power supply apparatus regenerates the current so that the output voltage Vo becomes its setting value. That is, as for the voltage to be applied to the output terminal of the switching power supply apparatus, with the regenerative current flowing, a voltage drop occurs, and the voltage Vo applied to the output terminal of the switching power supply apparatus becomes the setting value. In a state in which the regenerative current is flowing, an average value of the choke coil current IL of the choke coil 18 becomes minus.

Also, with control by a separately excited type (fixed frequency type), an ON timing of the main switching element 14 is generated in the switching frequency generation circuit 32 including oscillation circuit 31.

Operation when the regenerative current is equal to or smaller than the maximum regenerative current IoMAX is described for the periods A, B, J, K, and E of FIG. 12 and FIG. 13

(Operation in Period A)

With the PWM signal E4 being at a H level, the main switching element 14 is turned ON. On the other hand, the commutation element 16 is in an OFF state, and the current of the choke coil 18 is oriented to a plus direction, irrespectively of the magnitude of the regenerative current. In this state, when the triangular wave signal E2 depicted in FIG. 12 (c) crosses the duty control signal E3, the PWM signal of FIG. 12(d) falls from a H level to a L level, and VGS1 of FIG. 12(f) becomes at a L level from a H level. Thus, the main switching element 14 is turned OFF as depicted at the last of the period A.

(Operation in Period B)

After the main switching element 14 is turned OFF, the period B of a first deadtime when both of the main switching element 14 and the commutation element 16 are turned OFF is provided. Thus, electric charges accumulated in the parasitic capacitance 66 of the commutation element 16 are collected.

(Operation in Period J)

At a timing when the first deadtime in the period B passes and VGS2 of FIG. 12(g) rises from a L level to a H level to turn the commutation element 16 ON, since electric charges of the parasitic element capacitance of the commutation element 16 are collected in the period B, the commutation element 16 can be turned ON by soft switching operation. In this case, as depicted in (period J) of FIG. 13, a regenerative current flows to the secondary side and the primary side, and regenerative energy is accumulated in the choke coil 18 and the buffer capacitor 20.

(Operation in Period K)

In the period J, in a state in which the main switching element 14 is in an OFF state and the commutation element 16 is in an ON state, when the choke coil current IL of the choke coil 18 decreases to fall below zero, the operation enters the period K in which the current direction becomes a minus direction. In this case, as depicted in (period K) of FIG. 13, a regenerative current flows through the secondary side and the primary side, and accumulation of regenerative energy to the choke coil 18 continues. In this period K, the buffer capacitor 20 releases regenerative energy accumulated in the period J toward the choke coil 18.

When the last of the period K approaches, by the pulse signal E5 of the oscillation circuit 50 depicted in FIG. 12 (b), VGS2 of FIG. 12 (g) becomes at a L level from a H level, and the commutation element 16 is turned OFF as depicted at the last of the period K.

(Operation in Period E)

After the commutation element 16 is turned OFF, the period E of a second deadtime when both of the main switching element 14 and the commutation element 16 are turned OFF is provided. Here, since the choke coil 18 operates so as to try to let the choke coil current IL continuously flow, a side of the choke coil 18 without a dot becomes to have a plus polarity, and a side indicated by a dot becomes to have a minus polarity.

Therefore, a current by energy release of the choke coil 18 flows via a route from the plus side of the choke coil 18 to the parasitic capacitance 62 of the main switching element 14, the input power supply 12, and the minus side of the choke coil 18 indicated by the dot. Thus, electric charges accumulated in the parasitic capacitance 62 of the main switching element 14 are collected in the period E of the second deadtime.

At a timing when the second deadtime in the period E passes and VGS1 of FIG. 12(f) rises from a L level to a H level to turn the main switching element 14 ON, since electric charges of the parasitic capacitance 62 of the main switching element 14 are collected in the period E, the main switching element 14 can be turned ON by soft switching operation.

(Usability of Regenerative Operation)

In this manner, in the switching power supply apparatus including the regenerative function of the present embodiment, if the regenerative current is equal to or smaller than the maximum regenerative current IoMAX even during regenerative operation, that is, if the choke coil current IL of the choke coil 18 changes across zero, no recovery current flows through the main switching element 14 and the parasitic diode of the commutation element 16, and thus no surge voltage occurs.

Also, since drawing from the parasitic capacitances of the main switching element 14 and the commutation element 16 is performed by setting deadtimes, soft switching operation can be achieved. With this, a switching power supply apparatus including a regenerative function with high efficiency and low noise and at low cost and a bidirectional switching power supply apparatus can be achieved.

[Switching Power Supply Apparatus Including Surge Voltage Preventing Function with Respect to Excessive Regenerative Current]

(Operation when Surge Voltage Preventing Function is Absent)

In the switching power supply apparatus including the regenerative function, a surge voltage occurs when a regenerative current equal to or larger than the maximum regenerative current IoMAX is tried to be let flow by regenerative operation. Operation in this case is described for the periods F, L, and M of FIG. 12 and FIG. 13.

(Operation in Period F)

In a state in which an external voltage is applied to a load side of the switching power supply apparatus including the regenerative function to let a regenerative current flow, when the applied voltage is increased to a direction of increasing the regenerative current, as depicted in FIG. 12(*c*), the signal voltage of the duty control signal E3 decreases to shorten a period until the triangular wave signal E2 crosses the duty control signal E3. With this, a period until the PWM signal E4 becomes at a L level from a H level is shortened. In this manner, when an external voltage is applied to the load side, the switching control circuit 30 operates so that on-duty of the main switching element 14 is narrowed.

(Operation in Period L)

After the main switching element 14 is turned OFF, the period L of a first deadtime when both of the main switching element 14 and the commutation element 16 are turned OFF is provided. Here, the choke coil 18 operates so as to try to let the choke coil current IL continuously flow, a side of the choke coil 18 without a dot becomes to have a plus polarity, and a side indicated by a dot becomes to have a minus polarity.

Therefore, as indicated by an arrow in (period L) of FIG. 13, a current by energy release of the choke coil 18 flows via a route from the plus side of the choke coil 18 to the parasitic diode 60 of the main switching element 14, the input power supply 12, and the minus side of the choke coil 18 indicated by the dot.

(Operation in Period M)

With the first deadtime in the period L passing, VGS2 of FIG. 12(*g*) rises from a L level to a H level to turn the commutation element 16 ON. However, immediately after the commutation element 16 is turned ON, by recovery operation of the parasitic diode 60 of the main switching element 14, as indicated by an arrow in (period M) of FIG. 13, a large through current flows via a route of the plus side of the input power supply 12, the parasitic diode 60 of the main switching element 14, the commutation element 16, the buffer capacitor 20, and the minus side of the input power supply 12, energy is accumulated in a parasitic inductance by wiring, and this energy accumulated in the parasitic inductance causes the commutation element 16 to generate a surge voltage Vs as indicated by VSD1 of FIG. 12 (*h*)

Thus, an embodiment of a switching power supply apparatus including a function of not generating a surge voltage even if the regenerative current is equal to or larger than the maximum regenerative current IoMAX and inhibiting an excessive regenerative current from flowing is depicted in FIG. 14.

(Structure of Switching Power Supply Apparatus)

FIG. 14 is a circuit block diagram depicting the embodiment of the switching power supply apparatus including a surge voltage preventing function and a regenerative overcurrent protecting function with respect to excessive regenerative current.

As depicted in FIG. 14, the synchronous rectification step-up/down chopper circuit 10 provided as a power circuit on a primary side includes the main switching element 14 using a MOS-FET, the commutation element 16 using a MOS-FET, the choke coil 18, and the buffer capacitor 20. A power circuit on a secondary side includes the secondary winding 22 provided to the choke coil 18, a rectifying element 26a, and the output capacitor 24. The switching control circuit 30 includes the switching frequency generation circuit 32, the triangular wave generation circuit 34, the PWM circuit 36, the first deadtime generation circuit 38, the second deadtime generation circuit 40, and the commutation control inverter 42.

While these structures are identical to those of the embodiment of FIG. 1, in the present embodiment, the rectifying element 26a provided to the power circuit on the secondary side to achieve a reproducing function is taken as a MOS-FET capable of bidirectional rectification, and also a polarity detection circuit 84 and a commutation element ON-retention control circuit 88 are added.

The polarity detection circuit 84 includes a polarity detection coil 86 coupled to the choke coil 18, and detects the polarity of a voltage occurring in the choke coil 18 and outputs a polarity detection signal E9. That is, the polarity detection circuit 84 outputs the polarity detection signal E9 which becomes at a H level when a plus voltage occurs in the choke coil 18 to a direction with a dot, and outputs the polarity detection signal E9 which becomes at a L level when a plus voltage occurs to a direction without a dot. This is reverse to the case of the polarity detection circuit 70 of FIG. 6.

The commutation element ON-retention control circuit 88 performs control so that, when the polarity detection signal E9 which becomes at a L level with a plus voltage occurring in the choke coil 18 to the direction without a dot is outputted by the polarity detection circuit 84, ON of the commutation element 16 is retained even if a synchronous rectification control signal E7 outputted by the switching control circuit 30 becomes at a H level.

FIG. 15 is a descriptive diagram depicting operating waveforms when a surge voltage preventing function with respect to excessive regenerative current is provided, with signals of respective parts depicted as divided into FIG. 15(*a*) to (*k*), in which the polarity detection signal E9 of FIG. 15(*f*) is added to FIG. 12.

Since operations in periods A, B, J, K, and E are identical to those of FIG. 12, and therefore are omitted. Operations in periods F, L, and N after the periods above are described.

(Operation in Period F)

In a state in which an external voltage is applied to a load side of the switching power supply apparatus of FIG. 14 to let a regenerative current flow, when the applied voltage is increased to a direction of increasing the regenerative current, as depicted in FIG. 15 (*c*), the signal voltage of the duty control signal E3 decreases to shorten a period until the triangular wave signal E2 crosses the duty control signal E3. With this, a period until the PWM signal E4 becomes at a L level from a H level is shortened. In this manner, when an external voltage is applied to the load side, the switching control circuit 30 operates so that on-duty of the main switching element 14 is narrowed.

(Operation in Period L)

The period L is a first deadtime in which both of the main switching element 14 and the commutation element 16 are turned OFF. Since the choke coil 18 operates so as to try to let the choke coil IL continuously flow, a side of the choke coil 18 without a dot becomes to have a plus polarity, and a side indicated by a dot becomes to have a minus polarity.

Therefore, a current by energy release of the choke coil 18 flows via a route from the plus side of the choke coil 18 to the parasitic diode 60 of the main switching element 14, the input power supply 12, and the minus side of the choke coil 18 indicated by the dot, and the choke coil current IL continuously rises.

(Operation in Period N)

In the period N, the commutation control signal E7 which becomes at a H level is outputted, with the delay signal E6 from the first deadtime generation circuit 38 of the switching control circuit 30 outputted to the commutation control inverter 42. Here, since the choke coil 18 is in a state of releasing energy, the polarity detection signal E9 of the polarity detection circuit 84 keeps a state at a L level.

Thus, even if the switching control circuit 30 outputs the commutation control signal E7 which becomes at a H level, an AND circuit 90 of the commutation element ON-retention control circuit 88 is in a prohibited state by the polarity detection signal E9, which becomes at a L level, from the polarity detection circuit 84, and its output keeps a L level and ON of the commutation element 16 is retained.

Therefore, as with the period L, in the period N, as depicted in (period N) of FIG. 16, a current by energy release of the choke coil 18 flows via a route from the plus side of the choke coil 18 to the parasitic diode 60 of the main switching element 14, the input power supply 12, and the minus side of the choke coil 18 indicated by the dot, and the choke coil current IL continues to change toward zero.

In this state, when the choke coil 18 ends energy release, the polarity detection signal E9 of the polarity detection circuit 84 becomes at a H level, and the prohibited state of the AND circuit 90 of the commutation element ON-retention control circuit 88 is cancelled. Here, the commutation control signal E7 from the switching control circuit 30 is outputted to the commutation element 16 to turn the commutation element 16 ON.

Thus, at the last of the period N, after the choke coil current IL of the choke coil 18 becomes zero, that is, after the current flowing through the parasitic diode 60 of the main switching element 14 becomes zero, the commutation element 16 is turned ON. With this, recovery operation of the parasitic diode 60 of the main switching element 14 does not occur, a through current as depicted in (period M) of FIG. 13 does not flow, and no surge voltage occurs in the main switching element 14.

(Regenerative Current's Overcurrent Protecting Function)

In the switching power supply apparatus of FIG. 14, with ON retention control of the commutation element 16 in (period N) of FIG. 16 by the polarity detection circuit 84 and the commutation element ON-retention control circuit 88, even if the ON period of the commutation element 16 is prolonged as in the following periods J and K, control is performed so that the commutation element 16 is turned OFF by a pulse signal from the oscillation circuit 50 provided to the second deadtime generation circuit 40. Thus, an overcurrent protecting function of inhibiting an excessive regenerative current from flowing through the switching power supply apparatus can be achieved. That is, by performing control so that an OFF period of the commutation element 16 is provided in one cycle of switching for performing regenerative operation, the switching power supply apparatus can achieve an overcurrent preventing function of inhibiting an excessive regenerative current from flowing.

(Usability of Switching Power Supply Apparatus of FIG. 14)

In the switching power supply apparatus including the regenerative function of FIG. 14, by adding the polarity detection circuit 84 and the commutation element ON-retention control circuit 88, even if a large regenerative current flows, the commutation element 16 is not turned ON while a current is flowing through the parasitic diode of the main switching element 14, and therefore no surge voltage is generated in the main switching element 14, an element with low withstand voltage and low conduction resistance can be used as a semiconductor element such as a MOS-FET for use as the main switching element 14, and a switching power supply apparatus with a regenerative function with low noise and high efficiency can be achieved.

Also, since a peak value of the regenerative current is limited by ON time of the commutation element 16 to become not equal to or larger than one cycle of switching, a regenerative overcurrent protecting function, which is a function of inhibiting an excessive regenerative current from flowing, is also provided.

Modification Example of Present Invention

The present invention includes appropriate modifications without impairing its object and advantage. For example, the switching power supply apparatus may simultaneously include the main switching element ON-retention control circuit 74 and the commutation element ON-retention control circuit 88, and a polarity detection circuit may be configured in which the polarity detection coil 72 and the polarity detection coil 86 are achieved as one coil for shared use and the structure may be such that the main switching element ON-retention control circuit 74 and the commutation element ON-retention control circuit 88 are controlled by one polarity detection circuit. Also, a polarity detection coil may be used for the polarity detection circuit and, simultaneously, an auxiliary power supply circuit may be configured to generate driving electric power of the control circuit. Furthermore, the present invention is not limited by the numerical values described in the above embodiments.

DESCRIPTION OF REFERENCE NUMERALS

10: synchronous rectification step-up/down chopper circuit
12: input power supply
14: main switching element
16: commutation element
18: choke coil
20: buffer capacitor
22: secondary winding
24: output capacitor
26: rectifying element
28: load
30: switching control circuit
31, 50: oscillation circuit
32: switching frequency generation circuit
34: triangular wave generation circuit 36: PWM circuit
38: first deadtime generation circuit
40: second deadtime generation circuit
42: commutation control inverter
60, 64: parasitic diode
62, 66: parasitic capacitance
70, 84: polarity detection circuit
74: main switching element ON-retention control circuit
78: maximum duty limiting circuit
88: commutation element ON-retention control circuit

The invention claimed is:

1. A switching power supply apparatus comprising:
a primary-side circuit and a secondary-side circuit, the primary-side circuit being a synchronous rectification step-up or step-down chopper circuit configured by a series circuit including a main switching element and a choke coil connected in parallel with an input power supply and by a series circuit including a buffer capacitor and a commutation element connected in parallel with the choke coil, and the secondary-side circuit being configured by a series circuit including a second winding of the choke coil, a rectifying element and an output capacitor, an output electric power being obtained from both ends of the output capacitor; and
a switching control circuit including a first deadtime generation circuit and a second deadtime generation circuit configured to complementarily turn the main switching element and the commutation element ON and OFF with a predetermined switching frequency by providing a deadtime,
wherein the first deadtime generation circuit in the switching control circuit is a delay circuit for delaying an ON-duty of the main switching element by a predetermined time, and controls ON and OFF of the main switching element by outputting a control signal based on a PWM signal which is generated from a pulse signal of a switching frequency oscillation circuit which determines the predetermined switching frequency to generate a predetermined first deadtime,
the second deadtime generation circuit synchronizes frequencies of the switching frequency oscillation circuit and an oscillation circuit in the second deadtime generation circuit, and outputs a pulse signal from the switching frequency oscillation circuit which determines the predetermined switching frequency immediately before a pulse signal of the oscillation circuit in the second deadtime generation circuit to generate a predetermined second deadtime, and
the choke coil has an inductance set to have a value so that a current flowing through the choke coil flows in both of a positive direction and a negative direction in one cycle of switching when an output current of the switching power supply apparatus is equal to or smaller than a predetermined rated value.

2. A switching power supply apparatus comprising:
a primary-side circuit and a secondary-side circuit, the primary-side circuit being a synchronous rectification step-up or step-down chopper circuit configured by a series circuit including a main switching element and a choke coil connected in parallel with an input power supply and by a series circuit including a buffer capacitor and a commutation element connected in parallel with the choke coil, and the secondary-side circuit being configured by a series circuit including a second winding of the choke coil, a rectifying element and an output capacitor, an output electric power being obtained from both ends of the output capacitor;
a switching control circuit including a first deadtime generation circuit and a second deadtime generation circuit configured to complementarily turn the main switching element and the commutation element ON and OFF with a predetermined switching frequency by providing a deadtime;
a polarity detection circuit which detects a polarity of the choke coil and outputs a polarity detection signal; and
a main switching element ON-retention control circuit which performs control so that an ON signal of the main switching element outputted by the switching control circuit is retained and an OFF period continues when the polarity detection circuit outputs the polarity detection signal indicating a state where a current flows through the choke coil due to energy emission to the buffer capacitor,
wherein the first deadtime generation circuit in the switching control circuit is a delay circuit for delaying an ON-duty of the main switching element by a predetermined time, and controls ON and OFF of the main switching element by outputting a control signal based on a PWM signal which is generated from a pulse signal of a switching frequency oscillation circuit which determines the predetermined switching frequency to generate a predetermined first deadtime,
the second deadtime generation circuit synchronizes frequencies of the switching frequency oscillation circuit and an oscillation circuit in the second deadtime generation circuit, and outputs a pulse signal from the switching frequency oscillation circuit which determines the predetermined switching frequency immediately before a pulse signal of the oscillation circuit in the second deadtime generation circuit to generate a predetermined second deadtime, and
the choke coil has an inductance set to have a value so that a current flowing through the choke coil flows in both of a positive direction and a negative direction in one cycle of switching when an output current of the switching power supply apparatus is equal to or smaller than a predetermined rated value.

3. The switching power supply apparatus according to claim 2, further comprising a current limiting circuit which limits a maximum output current by providing an OFF period of the main switching element in one cycle of switching.

4. A switching power supply apparatus comprising:
a primary-side circuit and a secondary-side circuit, the primary-side circuit being a synchronous rectification step-up or step-down chopper circuit configured by a series circuit including a main switching element and a choke coil connected in parallel with an input power supply and by a series circuit including a buffer capacitor and a commutation element connected in parallel with the choke coil, and the secondary-side circuit providing a function of regenerating electric power from an output side of the switching power supply apparatus to a secondary-side of the choke coil, and being configured by a series circuit including a second winding of the choke coil, a rectifying element having a bidirectional rectifying function and an output capacitor, an output electric power being obtained from both ends of the output capacitor;
a switching control circuit including a first deadtime generation circuit and a second deadtime generation circuit configured to complementarily turn the main switching element and the commutation element ON and OFF with a predetermined switching frequency by providing a deadtime;

a polarity detection circuit which detects a polarity of the choke coil and outputs a polarity detection signal; and a commutation element ON-retention control circuit which performs control so that an ON signal of the commutation element outputted by the switching control circuit is retained and an OFF period continues and no surge voltage occurs when the polarity detection circuit outputs the polarity detection signal indicating a state where a current flows through the choke coil due to energy emission to the input power source, wherein the first deadtime generation circuit in the switching control circuit is a delay circuit for delaying an ON-duty of the main switching element by a predetermined time, and controls ON and OFF of the main switching element by outputting a control signal based on a PWM signal which is generated from a pulse signal of a switching frequency oscillation circuit which determines the predetermined switching frequency to generate a predetermined first deadtime, the second deadtime generation circuit synchronizes frequencies of the switching frequency oscillation circuit and an oscillation circuit in the second deadtime generation circuit, outputs a pulse signal from the switching frequency oscillation circuit which determines the predetermined switching frequency immediately before a pulse signal of the oscillation circuit in the second deadtime generation circuit to generate a predetermined second deadtime, the switching control circuit provides an OFF period of the commutation element in one cycle of switching, and the choke coil has an inductance set to have a value so that a current flowing through the choke coil flows in both of a positive direction and a negative direction in one cycle of switching when an output current of the switching power supply apparatus is equal to or smaller than a predetermined rated value.

* * * * *